US006961732B2

(12) United States Patent
Hellemann et al.

(10) Patent No.: US 6,961,732 B2
(45) Date of Patent: Nov. 1, 2005

(54) WEB BASED PROCESS CAPABILITY DATA COLLECTION AND REPORTING SYSTEM

(75) Inventors: Leslie McLean Hellemann, Lebanon, OH (US); Marita Platt Pettit, Loveland, OH (US); Christopher Cave Jackson, Liberty Township, OH (US)

(73) Assignee: General Electric Company, Schenectady, NY (US)

( * ) Notice: Subject to any disclaimer, the term of this patent is extended or adjusted under 35 U.S.C. 154(b) by 497 days.

(21) Appl. No.: 10/022,296

(22) Filed: Dec. 18, 2001

(65) Prior Publication Data

US 2003/0114948 A1 Jun. 19, 2003

(51) Int. Cl.[7] .............................................. G06R 17/00
(52) U.S. Cl. ...................... 707/102; 707/1; 707/104.1
(58) Field of Search ......................... 707/1, 3, 10, 102, 707/104.1, 100; 705/1, 22; 700/110; 706/45

(56) References Cited

U.S. PATENT DOCUMENTS

| | | | |
|---|---|---|---|
| 5,077,661 A | 12/1991 | Jain et al. .................... 364/402 |
| 5,452,218 A | * 9/1995 | Tucker et al. ............... 700/110 |
| 5,479,343 A | 12/1995 | Matoba et al. ............... 364/401 |
| 5,570,291 A | 10/1996 | Dudle et al. ............ 364/468.01 |
| 5,579,231 A | 11/1996 | Sudou et al. ........... 364/468.01 |
| 5,712,989 A | 1/1998 | Johnson et al. .............. 395/228 |
| 5,765,143 A | 6/1998 | Sheldon et al. ............... 705/28 |
| 5,777,877 A | * 7/1998 | Beppu et al. .................. 700/97 |
| 5,826,236 A | 10/1998 | Narimatsu et al. ............. 705/8 |
| 5,864,482 A | 1/1999 | Hazama et al. ......... 364/468.01 |
| 5,864,777 A | 1/1999 | Smith et al. ................. 702/156 |
| 5,946,662 A | 8/1999 | Ettl et al. ....................... 705/8 |
| 5,963,919 A | 10/1999 | Brinkley et al. ............... 705/28 |
| 5,974,395 A | 10/1999 | Bellini et al. ................... 705/9 |
| 5,978,771 A | 11/1999 | Vandivier, III .................. 705/8 |
| 6,125,312 A | 9/2000 | Nguyen et al. ................ 701/35 |
| 6,157,915 A | 12/2000 | Bhaskaran et al. ............. 705/7 |
| 6,167,320 A | 12/2000 | Powell .......................... 700/95 |
| 6,226,561 B1 | 5/2001 | Tamaki et al. ............... 700/100 |
| 6,233,493 B1 | 5/2001 | Cherneff et al. .............. 700/95 |
| 6,256,549 B1 | 7/2001 | Romero et al. ............. 700/121 |
| 6,266,655 B1 | 7/2001 | Kalyan ........................ 705/400 |

(Continued)

FOREIGN PATENT DOCUMENTS

| | | |
|---|---|---|
| EP | 0811941 A2 | * 10/1997 |
| EP | 001100046 A2 | * 5/2001 |

OTHER PUBLICATIONS

S. Bagchi, S. J. Buckley, M. Ettl, and G.Y. Lin, "Experience Using the IBM Supply Chain Simulator", Proceedings of the 1998 Winter Simulation Conference, pp. 1387–1394.

D. L. Heflin, and C.R. Harrell, "Simulation Modeling and Optimization Using ProModel", Proceedings of the 1998 Winter Simulation Conference, pp. 191–197.

S. Umeda and A. Jones, "An Integration Test–Bed System for Supply Chain Management", Proceedings of the 1998 Winter Simulation Conference, pp. 1377–1385.

Primary Examiner—Luke S Wassum
Assistant Examiner—Susan Rayyan
(74) Attorney, Agent, or Firm—McNees Wallace & Nurick LLC

(57) ABSTRACT

A system is provided that is accessible through a computer network and is used for collecting and tracking process capability data for manufacturers of parts. The recipient of the parts can input information on the characteristics of the parts that require process capability data into the system. The manufacturer of the parts can then access the system and enter process capability data relative to a specific part and characteristic. The system can then be used by both recipients and manufacturers to generate reports on the process capability status for all parts, processes, characteristics and manufacturers.

8 Claims, 12 Drawing Sheets

U.S. PATENT DOCUMENTS

| | | | |
|---|---|---|---|
| 6,466,927 B1 * | 10/2002 | Dougherty et al. | 706/45 |
| 6,484,169 B1 * | 11/2002 | Wilsford | 707/6 |
| 6,631,305 B2 * | 10/2003 | Newmark | 700/110 |
| 6,633,788 B1 * | 10/2003 | Riley et al. | 700/97 |
| 6,643,615 B1 * | 11/2003 | Bauer et al. | 703/6 |
| 6,691,127 B1 * | 2/2004 | Bauer et al. | 707/102 |
| 2002/0072987 A1 * | 6/2002 | Knudsen et al. | 705/26 |
| 2002/0116372 A1 * | 8/2002 | Ladouceur et al. | |
| 2003/0009397 A1 * | 1/2003 | Whitenack et al. | 705/28 |
| 2003/0023519 A1 * | 1/2003 | Zulpa et al. | |
| 2004/0030611 A1 * | 2/2004 | Byrne | |

* cited by examiner

| | A | B | C | D | E | F | G | H | I | J | K | L |
|---|---|---|---|---|---|---|---|---|---|---|---|---|
| 1 | Source Code | PartNumber | Nomenclature | CharName | CN | Drawing Revision | CharType | Requirement | Feature | CharClass | MaterialSpec | MaterialC |
| 2 | 750 | 1234M99G13 | | COATING THICKNESS | 0 | – | KCO | Reliability | Coating | Thickness | A50TF272 | |
| 3 | 750 | 1234M99G13 | | ROUNDNESS | 12 | – | CRI | Producibility | | Thickness | A15BB2A1 | |
| 4 | 750 | 1385M90P04 | | | 111 | A | CTQ | Technical | | LE Thickness | UNKNOWN | A |
| 5 | 750 | 1385M90P04 | | CONCENTRICITY | 0 | – | KCC | Producibility | | Concentricity | | |
| 6 | 750 | 1385M90P04 | | HOLE DIAMETER | 21 | Z | CTQ | Technical | | Dia (Major) | A15B116A | |
| 7 | 750 | 1385M90P04 | | HOLE RADIUS | 33 | S | CTC | Reliability | Hole | Radius | | |

900

WEB BASED PROCESS CAPABILITY DATA COLLECTION AND REPORTING SYSTEM

BACKGROUND OF THE INVENTION

The present invention is directed generally to a system and application for collecting and tracking process capability data for manufacturers of parts.

Process capability relates to the ability of a manufacturer or supplier to produce, from a design, parts or products that do not have any defects. Defects in a part or product can range from not having a part dimensioned within design tolerances to a part that does not have the proper material composition. Defects in parts can impact a company's profitability, if the company has to discard or repair parts because of defects in the parts. In addition, defects in the parts can also pose safety risks to the company's employees and customers, if the parts are incorporated into machines and devices, which fail because of the defects in the parts. Therefore, a company would want to use manufacturers or suppliers that can produce parts and products without defects. For example, a company that desires high quality may require a manufacturer or supplier to produce parts or products with less than five defects per million opportunities.

The ability of the company to measure the process capability of a manufacturer or supplier is important for the company to determine if the manufacturer or supplier is producing parts or products with the desired level of quality. One technique for a company to measure the process capability of a supplier is for the supplier to enter manufacturing and process capability data into a spreadsheet and then transmit the data to the company by fax, mail or e-mail. The process capability information is then only available to a select group of people who have access to the e-mail or fax with the data. In addition, each supplier may use a different spreadsheet program or each supplier may format the data in the spreadsheet differently. This non-uniformity between suppliers results in the receiver of the information having to use several spreadsheet programs or having to take the time to reformat the received information in order to be able to understand and compare information.

Another technique for the company to measure the process capability of a supplier is for the supplier to provide the information "on-line" to the company. While this technique may provide many people with access to the data, the technique had several drawbacks. One drawback is that the supplier has to directly connect to the company's computer and enter the information one record at a time through a complicated and difficult to use interface. In addition, a significant amount of time is required to enter the information into the computer because of very slow update and refresh times for the system.

Other available techniques are related to supply chain management, but not to tracking process capability. For example, U.S. Pat. No. 6,151,582 relates to a decision support system for the management of a supply chain. The decision support system can be used to model processes of the supply chain such as inventory control and sales forecasting. The information from the models can then be used to make decisions on how to manage the supply chain. U.S. Pat. No. 6,157,915 also relates to the management of a supply chain. Management of the supply chain is accomplished by providing parties in the supply chain with a business scenario or plan and then reviewing the information and feedback from the parties regarding the plan to make a decision on the plan. Finally, U.S. Pat. No. 5,479,343 relates to a production planning system. The production planning system is used to develop and manage plans for maintaining production dates and capacities.

Therefore, what is needed is a system that can collect and report on process capability data that can be widely accessed by both company employees and suppliers while being easy to use and quickly updated.

SUMMARY OF THE INVENTION

One embodiment of the present invention is directed to a system for collecting and recording product data on a plurality of products. The system includes a server computer, a database, a client computer and an application. The server computer includes a storage device and a processor. The database stores product data on a plurality of products. Product data can include process capability information for each product of the plurality of products. The application manages entry, storage and retrieval of process capability information in the database by a user. In addition, the application is stored in the storage device of the server computer. Furthermore, the application includes a product information section, a file management section, and a report generation section. The product information section has means for providing, updating and reviewing process capability information for a product. The file management section has means for performing a bulk transfer of process capability information for at least one product. The report generation section has means for generating at least one report using the process capability information in the database. Finally, the client computer is in communication with the server computer and provides the user access to the application.

Another embodiment of the present invention relates to a computer program product embodied on a computer readable medium and executable by a computer for collecting and recording product data on a plurality of products. The computer program product includes a database, a characteristic system, a file management system, and a report generation system. The database stores product data on a plurality of products. The product data includes process capability information for each product of the plurality of products. The characteristic system includes means for entering process capability information for a product in the database by a user. The file management system includes means for performing a bulk transfer of process capability information for at least one product to the database by the user. The report generation system includes means for generating at least one report using the product data in the database.

Still another embodiment of the present invention relates to a method of collecting data on a manufactured product from a source. The method having the steps of identifying important characteristics of a product, developing a process plan for manufacturing the product and a plan for data collection on the product using the important characteristics, and evaluating each measurement system for measuring product data in the data collection plan for the product. The method also includes the steps of collecting first product data on the product according to the data collection plan in response to a positive evaluation of each measurement system, evaluating the manufacturing process plan based on the collected first product data, and collecting second product data on the product according to the data collection plan in response to a positive evaluation of the manufacturing process plan based on the collected first product data.

Finally, the method includes the steps of evaluating the manufacturing process plan based on cumulative collected product data, storing the cumulative collected product data in a database in response to a positive evaluation of the manufacturing process plan based on the cumulative collected product data, collecting additional product data on the product according to the data collection plan, and repeating the steps of evaluating the manufacturing process plan based on cumulative collected product data, storing the cumulative collected product data in a database in response to a positive evaluation of the manufacturing process plan and collecting additional product data on the product according to the data collection plan.

One advantage of the present invention is that all process capability data is stored in one central process capability database accessible by all approved quality and engineering personnel.

Another advantage of the present invention is that system up and screen update times have been improved and rapid uploading or downloading of process capability data can be accomplished with a bulk transfer feature.

Still other advantages of the present invention include a minimization of network activity, data proofing at the client level, maximized data exposure at the client level, and complete report functionality.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

FIG. 6 illustrates a web page of the PROCAP application for entering process capability data.

FIG. 9 illustrates a spreadsheet web page of the file management portion of the PROCAP application.

Whenever possible, the same reference numbers will be used throughout the figures to refer to the same parts.

DETAILED DESCRIPTION OF THE INVENTION

Figure 1:
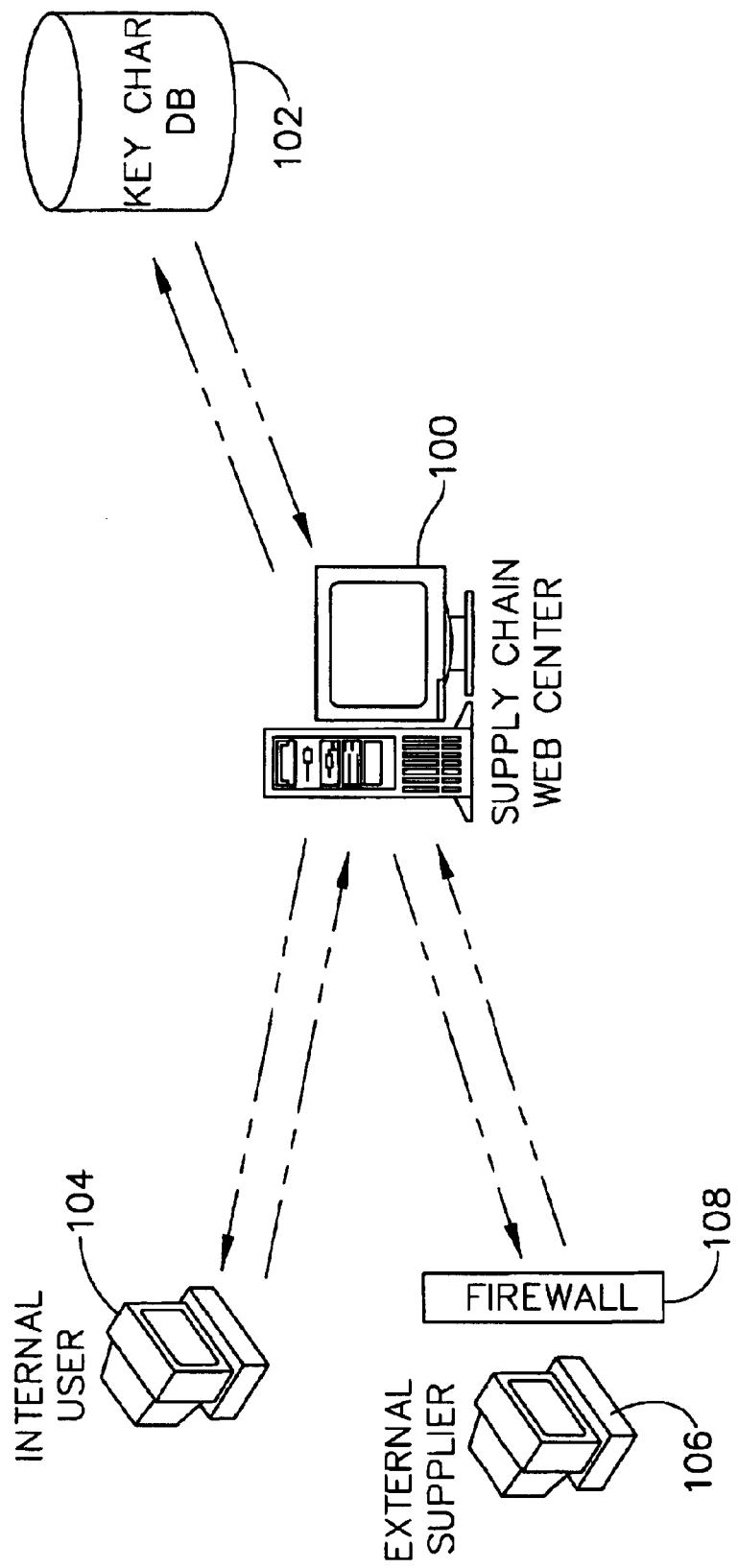
FIG. 1 illustrates a schematic arrangement of a system of the present invention.

FIG. 1 illustrates a schematic arrangement of one embodiment of the system of the present invention. The system includes a server computer(s) 100 connected by a computer network to at least one client computer 104, 106. The server computer 100 can preferably store an application for process capability data collection and reporting (PROCAP). The PROCAP application communicates with a database(s) 102 that stores information relating to process capability. The database 102 can be stored on the server computer 100, but can also be stored on another computer that is connected to and accessible by the server computer 100, e.g. another server computer or a client computer 104. The PROCAP application and the database 102 can be accessed on the server computer 100 by internal users using internal client computers 104 and by external suppliers, manufacturers, vendors, etc. on external client computers 106. Before suppliers on the external client computers 106 can access the PROCAP application on the server computer 100, the supplier and external client computer 106 have to comply with appropriate security precautions, such as passing through a firewall 108.

In a preferred embodiment of the present invention, when executing the PROCAP application, the client computers 104, 106 send or transmit SQL queries to the server computer 100, which then submit the SQL queries to the database 102. The submission of queries by client computer 104, 106 and server computer 100 to the database 102 use Java database connectivity, however the PROCAP application can also use other types of database connectivity and query languages. After the query has been processed, the database 102 returns a resultant data set to the server computer 100. The server computer 100 then transmits the resultant data set and any additional HTML code or Java Applets to the client computers 104, 106 for the display the resultant data set on the client computer 104, 106.

In a preferred embodiment of the present invention, the PROCAP application is implemented as a network application that is executed in a web browser on the internal client computer 104 of the user or engineer and on the external client computer 106 of the supplier. The PROCAP application can be executed on the client-side, the server-side or on both the client-side and the server-side. In another embodiment, each client computer 104, 106 on the computer network may store an individual copy of the PROCAP application, which can access the corresponding database(s) 102 stored on the server computer 100. In an alternate embodiment of the present invention, the PROCAP application can be a network application that is executed in a windows or other similar environment. In this embodiment, instead of loading and viewing web pages, a user would load and view windows or screens.

The computer network is preferably an Extranet, however any other type of network can also be used, for example, the Internet, a local area network (LAN), a wide area network (WAN) or an Intranet. The client computer 104, 106 and server computer 100 can be any type of general purpose computer having memory or storage devices (e.g. RAM, ROM, hard disk, CD-ROM, etc.), processing units (e.g. CPU, ALU, etc.) and input/output devices (e.g. monitor, keyboard, mouse, printer, etc.). The general purpose computer may also have communication devices (e.g. modems, network cards, etc.) for connecting or linking the general purpose computer to other computers.

In another embodiment of the present invention, the PROCAP application can be executed without any requirement for a network connection. The PROCAP application can be executed from an internal memory or storage device, e.g. RAM, ROM, hard disk, etc., of the client computer 104, 106 of the user in either a web browser as discussed above or in an operating system environment, such as a Windows environment, a Linux environment or a Unix environment. The PROCAP application can be loaded into the internal memory of the user's computer from a portable medium such as a CD-ROM, DVD-ROM, floppy disk, etc., that is inserted into the computer. Alternatively, the PROCAP application can be transferred or loaded directly into the internal memory of the user's computer through an electronic connection with another computer that has a stored copy of the PROCAP application. In other words, the PROCAP application can be downloaded to the user's computer from another computer over a network connection or an Internet connection and then can be operated without the network connection. The user is able to use the PROCAP application without a network connection and is able to store process capability data and related information and documents in a database. However, for other users to be able to have access to the process capability data and related information and documents, the user has to reestablish a network connection and upload any process capability data and related information and documents into the common process capability database 102 that can be accessed by all users.

The PROCAP application can be accessed from a portal or web center on the computer network. In one embodiment of the present invention, the portal or web center is directed to supply chain matters and the PROCAP application is one application that is accessible from the supply chain web center. The PROCAP application can be part of any portal or web center that is accessible on the computer network or can be an individual application that is accessible on the computer network.

Figure 2:
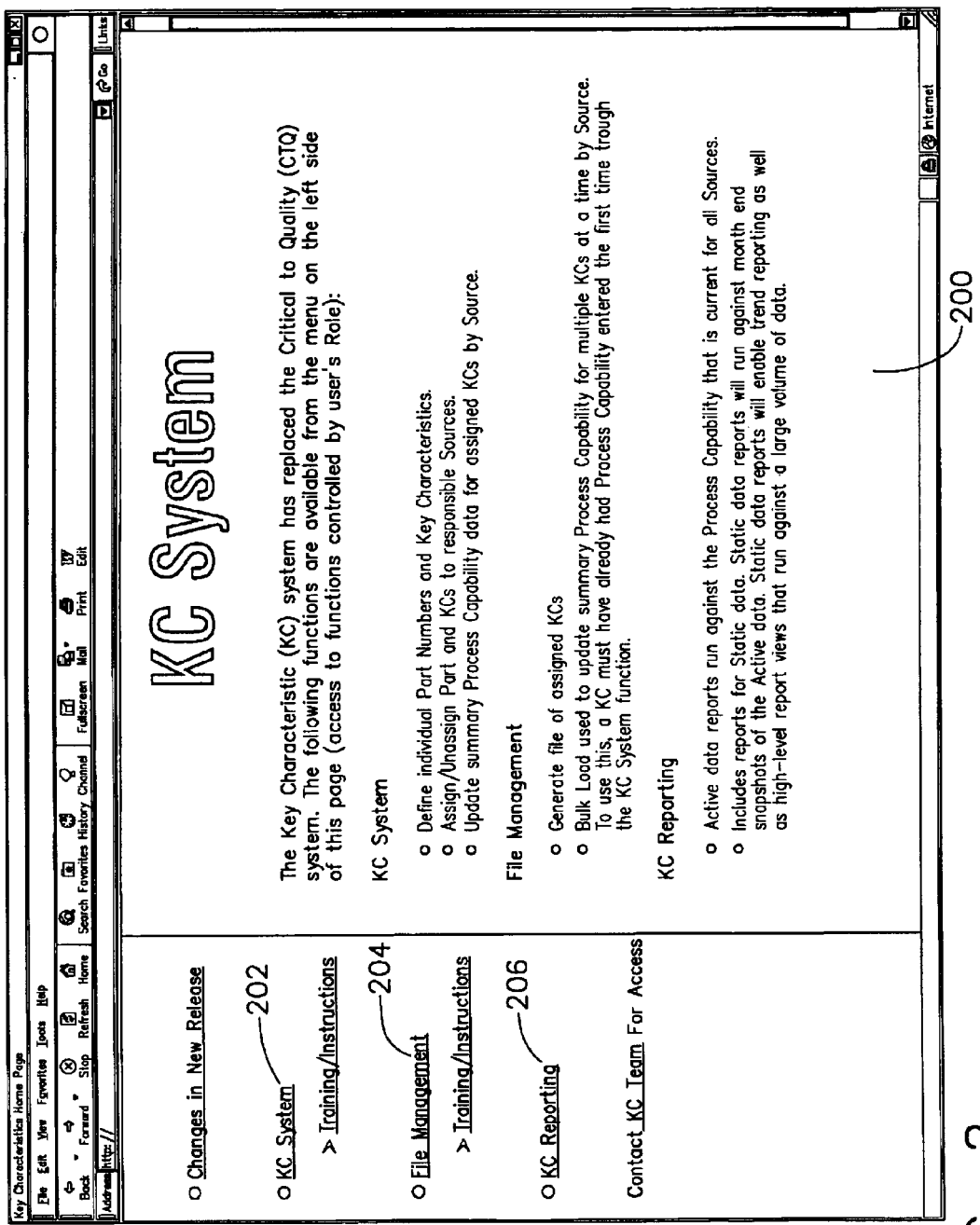
FIG. 2 illustrates a home web page for the PROCAP application.

FIG. 2 illustrates a home web page or starting web page 200 for the PROCAP application. From the home web page 200 a user can access several different functions in the PROCAP application. The user can access the key characteristic (KC) system of the PROCAP application by selecting an option or link 202 on the home page 200. The user can access the file management portion of the PROCAP application by selecting another option or link 204. Finally, the user can access the KC reporting portion of the PROCAP application by selecting a third option or link 206. Each of the KC System, the file management portion and the KC reporting portion of the PROCAP application will be described in greater detail below.

Figure 3:
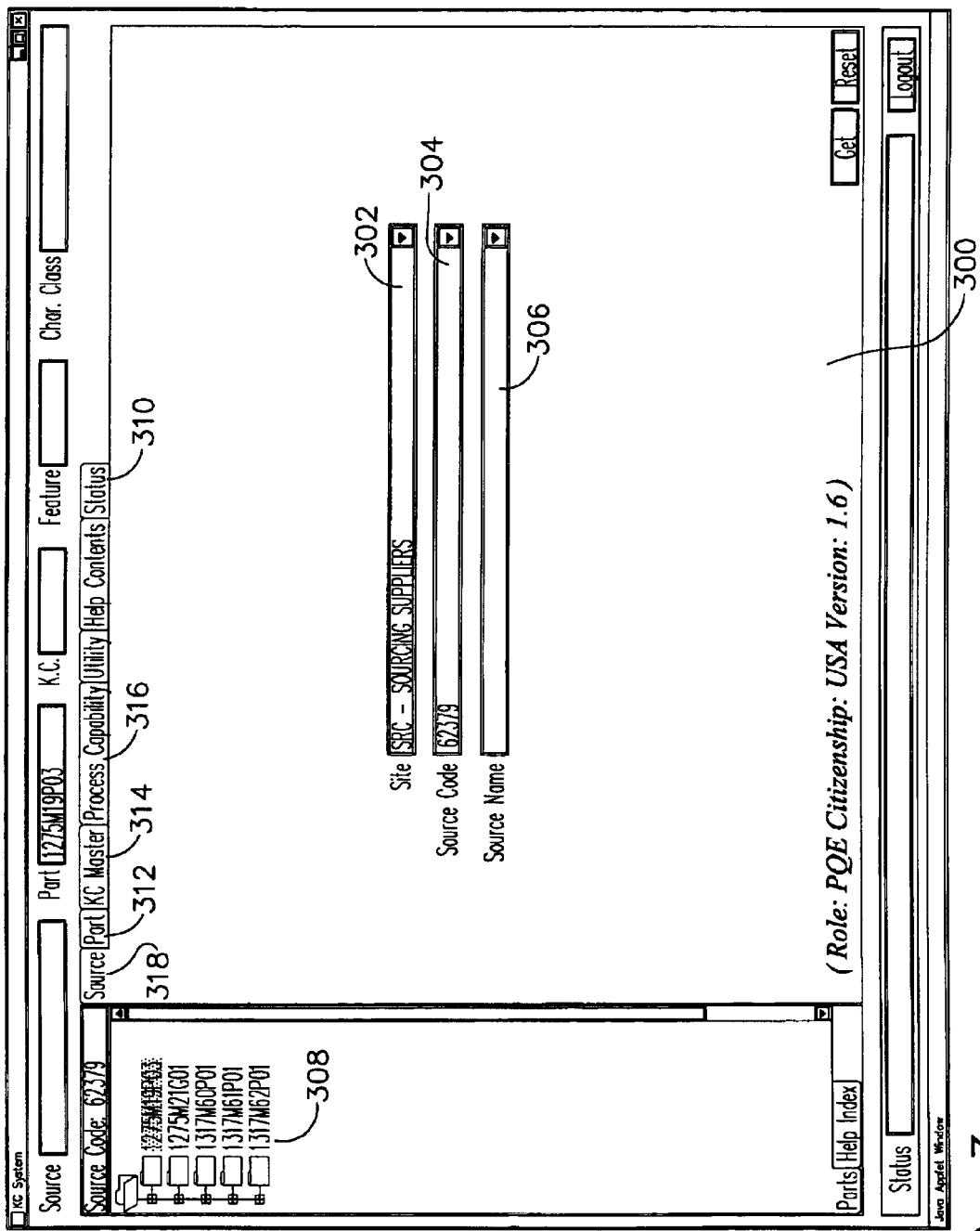
FIG. 3 illustrates a web page of the PROCAP application for selecting a supplier.

When the user selects the KC system link 202, the user is transferred or linked to the KC system. FIG. 3 illustrates a source selection web page 300 of the KC system. The source selection web page 300 is preferably the web page that the user is connected to upon selecting the KC system link 202. On the source selection web page 300, the user can select the source that is providing or will provide process capability data. To select the source, the user can enter a site in field 302, a source code in field 304 or a source name in field 306. The site is the location where the part is manufactured. The source code is a unique 5 character code assigned to an outside supplier or if the source is an internal shop, the 4 digit assigned workstation number. The source name is the specific manufacturer's name or the specific company manufacturing/assembly component name that produces the part.

The user can either manually enter or type in the information into the fields 302–306 or the user can select a pull-down menu that is associated with each of the fields 302–306 that lists all of the possible valid entries into the corresponding field. Once the user has entered information into a field 302–306, the PROCAP application can then automatically enter the corresponding information into the remaining fields 302–306, as appropriate. However, when the user enters a site in field 302, the user may still have to enter source information in fields 304–306 to obtain the desired source of the user, if there is more than one source at a particular site.

After the user has designated a source in fields 302–306, a listing or navigation tree 308 is provided and lists for the user all of the assigned parts and characteristics of the source. The parts assigned to a source are designated by a part number which preferably corresponds to the engineering number that appears in the engineering drawing title block for the part. The user can then drill down the navigation tree 308 to assign and revise part data and characteristic data for a part, to obtain process capability data on a characteristic, to enter process capability data for a part or any other similar task supported by the PROCAP application. The user has to select or highlight the particular part, characteristic, etc. in the navigation tree 308 to perform tasks on the part, characteristic, etc., using tab bar 310. It is to be understood that different users may have different access rights to the different functions of the PROCAP application and certain users may not be able to access or revise certain information in the database 102.

After the user has selected or focused on a part or characteristic in the navigation tree 308, the user can then add, delete, revise and review information pertaining to the part or characteristic by selecting certain tabs on the tab bar 310. The information relating to the parts can be loaded on the client computer 104, 106 all at once or can be loaded on the client computer 104, 106 at different times depending on the tab selection by the user. By selecting tab 312 the user is provided with a web page that includes information on the part. By selecting tab 314 the user is provided with a web page that includes information on key characteristics of the part. Additionally, by selecting tab 316 the user is provided with a web page that includes information on the part's process capability. The user may also change the source as described above by selecting tab 318 at any time to return to web page 300. Finally, the tab bar 310 may also have additional tabs that are not described in detail herein that can provide the user with additional options and functions. Some of the options that may be provided in tab bar 310 include providing status information and help information.

Figure 4:
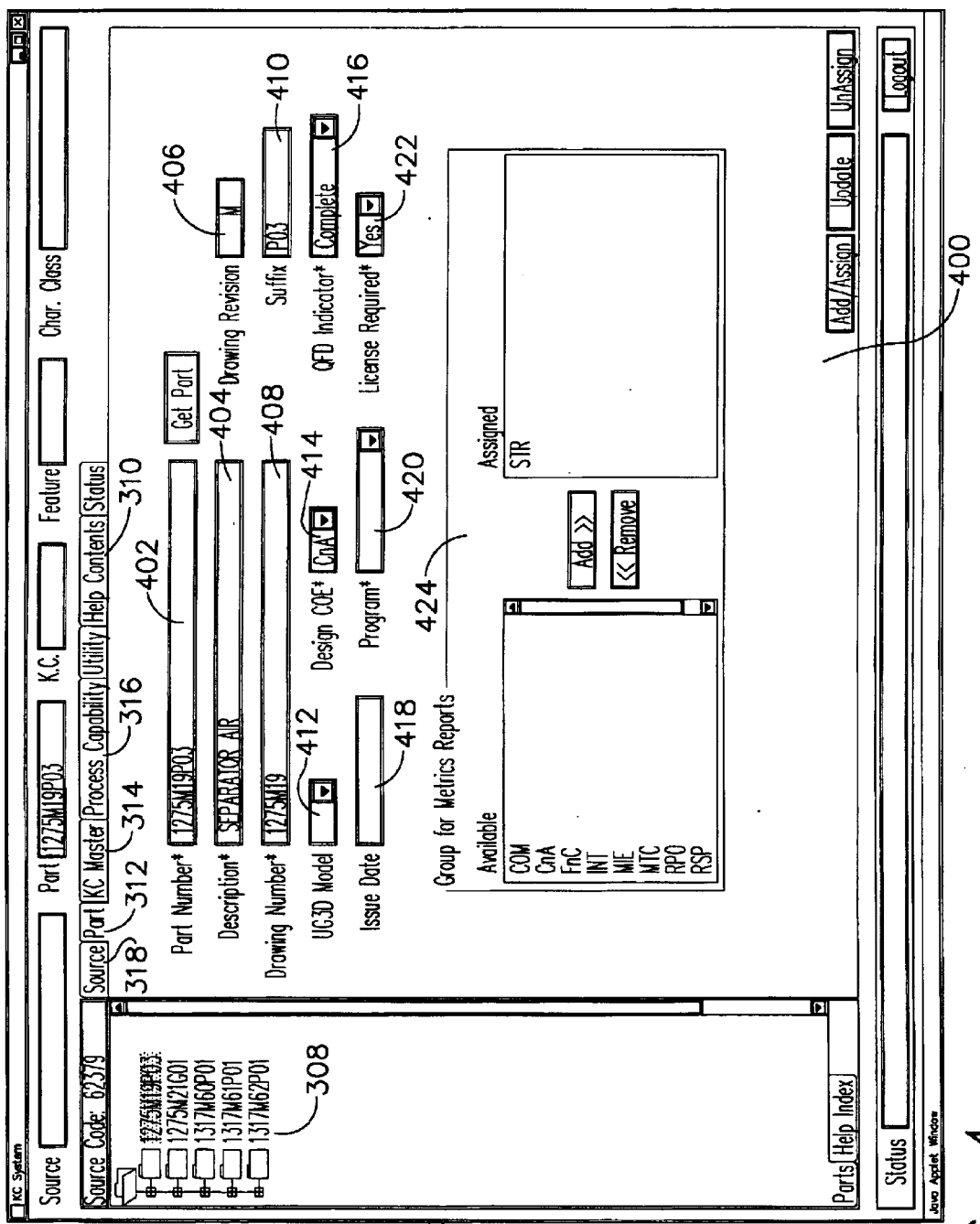
FIG. 4 illustrates a web page of the PROCAP application for updating information on a part.

When the user selects tab 312, the user is provided with a web page that includes part information. FIG. 4 illustrates a web page 400 that has the part information for the selected part in the navigation tree 308. The user may add or assign a part to the source selected, update information on the part, or unassign or remove a part from the selected source on part web page 400. To add or assign a part to a source, the user has to select any part in the navigation tree 308 and enter a part number into part number field 402. After entering the part number the user can select a get part option, which is typically a button associated with part number field 402, to check the database 102 to determine if that part number is stored in the database 102. If the part number is stored in the database 102, then the user can retrieve the part information from the database 102 and update the retrieved information, as appropriate, for the part. Then by selecting the add or assign option, the user can add the part number to the selected source. If the part number is not in the database, the user has to enter information on the part, including all required information, and then select the add or assign option to add the part number to the source. The addition of a part is then reflected in navigation tree 308 and the database 102 is updated to include the part number and information. To unassign or remove a part number from a source, the user has to select the unassign option to remove the part number from that particular source. After the user has unassigned a part number for a source, that part number is no longer displayed in the navigation tree 308 for that source.

On part web page 400, the user can update the information stored in the database 102 for the part and then update the part information in the database 102 by selecting an update option. The user can edit the description of the part in part description field 404. The user can also edit information relating to any associated drawing for the part by changing information in drawing revision field 406, drawing number field 408 and drawing suffix field 410. The drawing revision denotes the current revision of the drawing/part number. The drawing number is the engineering number that appears in the engineering drawing title block. The drawing suffix is a unique identifier added to a drawing number to create a specific part number.

Some additional fields the user can modify are UG3D model field 412, design group field 414 and QFD Indicator field 416. The information in UG3D model field 412 relates to the UniGraphics 3-D model of the part. The information in QFD Indicator field 416 relates to the Quality Function Deployment (QFD) status. The QFD status indicates whether a QFD has been performed on the part. A QFD is a method for translating customer expectations into prioritized company requirements at each stage of development, production and delivery. It is a systematic numerical decision analysis performed by a cross functional team consisting of manufacturing and engineering representatives which focuses on the wants of the customer as expressed in the customer's own words and prioritizes the select few requirements critical to customer satisfaction.

Other fields the user can modify are issue date field 418, program field 420 and license required field 422. Certain parts may require an export license to manufacture and to review engineering data, and have to be designated as such in license required field 422, if an export license is required to view the engineering technical data. The issue date in issue date field 418 is the date that the part drawing was issued. Finally, the user can designate the groups for metrics reports in reports field 424. The user can select groups to receive metrics reports and then add them to the list of designated recipients or the user can select a group for removal from the list of designated recipients.

Figure 5:
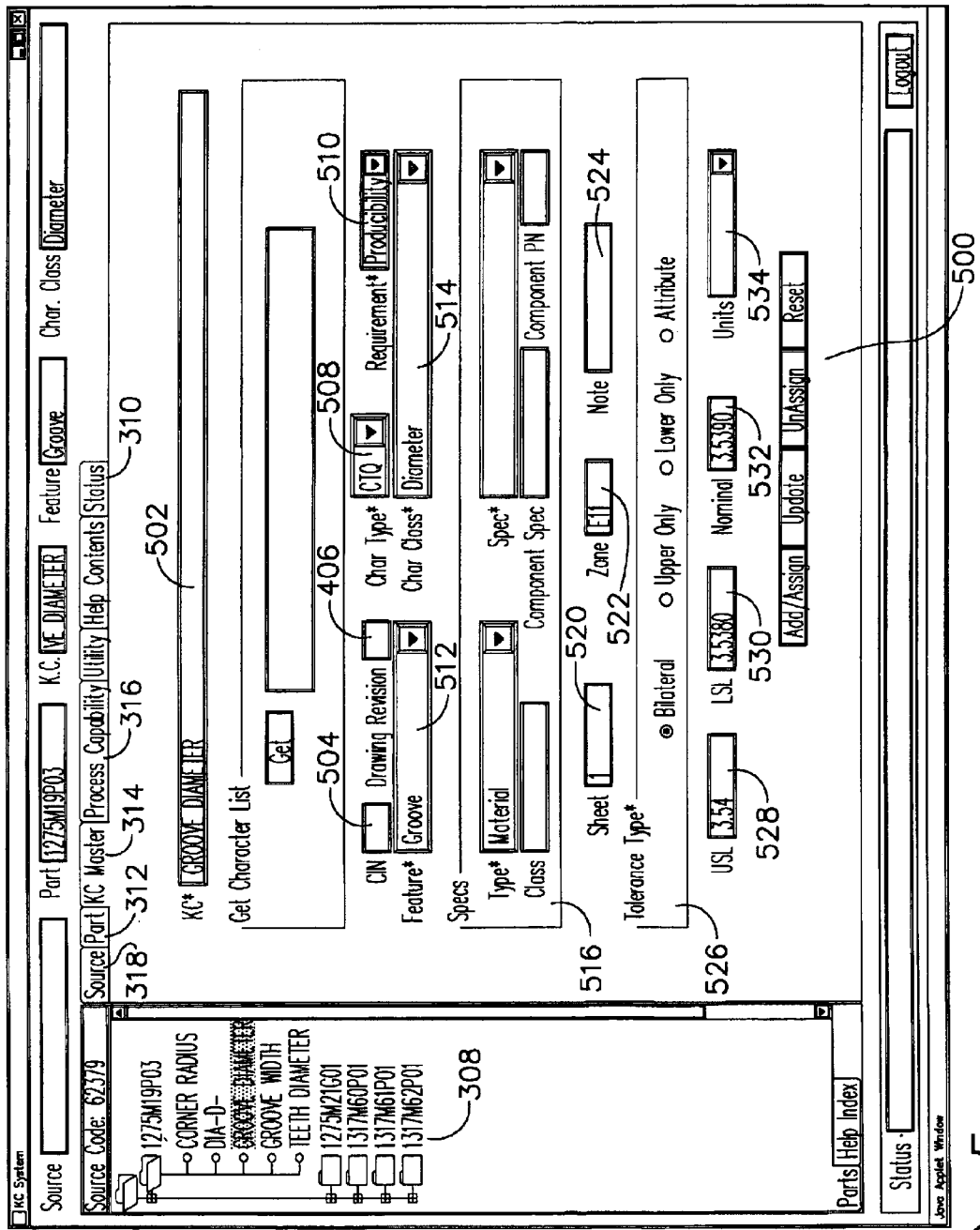
FIG. 5 illustrates a web page of the PROCAP application for designating key characteristics of a part.

Once the user has selected a part and a characteristic of that part from the navigation tree 308, the user can then select tab 314 to be provided with a web page that includes information on the selected characteristic. The characteristics of the part can be referenced as key characteristics. FIG. 5 illustrates a web page 500 that has information on the selected key characteristics of the part in the navigation tree 308. The user can also add or assign a characteristic to the part selected, update information on the characteristic or unassign or remove a characteristic from the selected part. In a preferred embodiment of the present invention, a user from the company is adding, updating and removing key characteristics and key characteristic information. However, the source or supplier can have some input into the key characteristics for a part and the associated key characteristic information.

To add or assign a characteristic to a part, the user has to select the part in the navigation tree 308. The user then selects an option to obtain a list of all available characteristics for that part. After reviewing the list of available characteristics for the part, the user may select an unassigned characteristic and then select an add or assign option to add that characteristic to that part. Before adding the characteristic the user may revise and edit information associated with that characteristic. If there are no unassigned characteristics or the desired characteristic is not listed, the user may enter a characteristic name in characteristic name field 502. The Key Characteristic (KC) name uniquely identifies the KC by giving it a name. The user also has to enter any other required information for the characteristic before the user can add the characteristic to the part as described above. To unassign a characteristic to a part, the user has to select the unassign option to remove the characteristic from that particular part. After the user has unassigned a characteristic for a part, that characteristic is no longer displayed in the navigation tree 308 for that part.

On characteristic web page 500, the user can update the information stored in the database 102 for a characteristic associated with a particular part. The user can update the CIN field 504, the drawing revision field 406, the characteristic type field 508, the requirement field 510, the feature field 512 and the characteristic class field 514. The characteristic identification number (CIN) in CIN field 504 is the number located on the ballooned drawing used for first article inspection. The characteristic type in characteristic type field 508 can be classified as follows: Critical to Quality (CTQ); Critical to Cost (CTC); Key Control Characteristic (KCC); Major (MAJ); Critical (CRI); Other Key Characteristic (OKC), which doesn't fit any of the above categories; and Non Key Characteristic (NONKC). Requirement information in requirement field 510 defines why the characteristic was identified for data collection and process capability analysis. There are three selections for why the characteristic was identified for data collection: Producibility; Reliability; or Technical. Feature information and characteristic class are used to describe a CTQ characteristic type. The feature information describes the physical area on the part and the characteristic class information describes the part of the feature to be measured. Feature field 512 and characteristic class field 514 include pull down menus that have lists of features and characteristic classes. One selection from each list can be used to create a description of the CTQ characteristic type.

The user can also update and modify specification information in specs field 516. In specs field 516, the user can specify the type of specification, e.g. a material or a component. If the specification type is a material, then a material specification may be provided which lists the substance from which the product is made. A material specification is normally listed as a specification on the engineering drawing. A material classification may also be provided which is a grouping of the requirements within the material specification of different categories for processing, properties, testing and product usage. The class designation follows the specification number of the engineering drawing. If the specification type is component, then component specification information may be provided. A component specification is assigned to non-company designed hardware to describe operational performance characteristics and manufacturing requirements. For example, if a control valve were to be designed and built by a supplier, the company would issue a component specification that would describe the engineering operational characteristics and manufacturing process requirements for the valve. The supplier would design and manufacture the valve to the component specification requirements.

In addition the user can modify and update drawing information in drawing sheet field 520, drawing zone field 522 and note field 524. The drawing sheet denotes the drawing sheet number on which the characteristic is found. The drawing zone denotes the drawing zone in which the characteristic is found. The note denotes the drawing note number where the characteristic is defined.

The user can designate or modify the tolerance type in field 526. The tolerance type identifies tolerancing as variable or attribute. There are three choices of variable tolerancing data: Bilateral (two sided limits); Upper Only (upper specification limit only); and Lower Only (lower specification only). The attribute type is used is for discrete data (go/no-go).

Finally, the user can modify or designate information in the USL field 528, the LSL field 530, the nominal field 532 and the units field 534. The Upper Specification Limit (USL) for a characteristic is the upper of the functional numerical limit(s) as specified on the drawing. The USL can exclude process limits, material review board (MRB) limits and other limits not specifically on the drawing. A USL may not exist for one-sided specifications. The lower specification limit (LSL) for a characteristic is the lower of the functional numerical limit(s) as specified on the drawing. The LSL can also exclude process limits, MRB limits, and other limits not specifically on the drawing. The LSL may not exist for a one-sided specification. The nominal value is the value exactly as shown on the engineering drawing/specification. A nominal value does not exist for single sided specifications. The units field 534 indicates the unit of measure for the characteristic being studied, e.g. inches.

Figure 6:
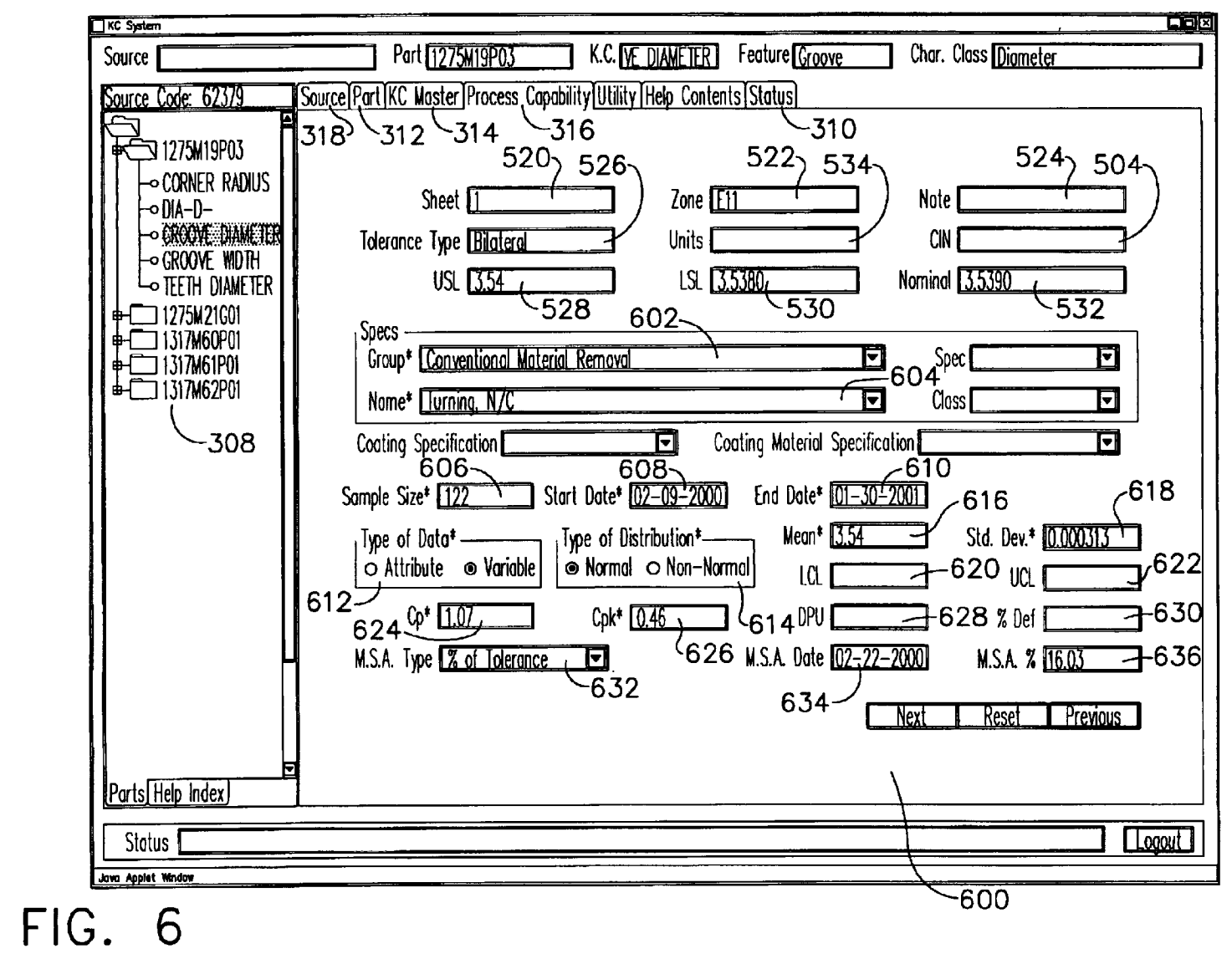

Once the user has selected a part and a characteristic of that part from the navigation tree 308, the user can then select tab 316 to be provided with a web page that includes process capability information on the selected characteristic. FIG. 6 illustrates a web page 600 that has the process capability information for the selected part characteristic in the navigation tree 308. The process capability information for the characteristic is based on the parameters defined for the characteristic. The user may add or update process capability information for the selected characteristic on process capability web page 600. In a preferred embodiment of the present invention, a user from the source or supplier is adding, updating and removing process capability information for review and evaluation by users of the company.

Several of the fields on the process capability web page 600 can be filled in or completed automatically from data that has been previously entered into the PROCAP application. For example, information entered into characteristic web page 500 when defining the key characteristic can be used to complete fields on the process capability web page 600. The user can then enter the process capability information into process group field 602 and process name field 604. The process group relates to broad categories of processes that provides a brief description of the process that creates the KC, e.g Welding, Machining, etc. The process name relates to the specific machining process, e.g. Electron Beam Welding, Milling, etc. If a coating process group is selected in process group field 602, then additional fields on the process capability web page 600 relating to coating information can be accessed and edited.

The user can then enter sample information in sample size field 606, sample start date field 608 and sample end date field 610. The sample size is the number of measured values used to estimate the process standard deviation. This is the standard deviation used to estimate process capability, Cp and Cpk. The start date is the date of the first characteristic generated in the sample and the end date is the date the last characteristic was generated in the sample.

The user can select the data type in type of data field 612 and the distribution type in type of distribution field 614. The type of data indicates whether the data is an attribute or a variable. The user can provide statistical information in mean field 616, standard deviation field 618, LCL field 620 and UCL field 622. The mean is determined by adding up all of the measurements of the KC and dividing by the number of measurements. The standard deviation is a measure of variability (dispersion) of observations around the arithmetic mean of the observations. It may be calculated by the root mean square method or from a control chart. Furthermore, a sigma represents one standard deviation as calculated from the process data. The lower control limit (LCL) is derived from the data produced from the process. It is usually minus three standard deviations from the mean. The upper control limit (UCL) is derived from the data produced from the process. It is usually plus three standard deviations from the mean.

The user can enter Cp data into Cp field 624. The process capability index (potential), Cp, is a ratio of the total engineering tolerance divided by the process variation expressed as six process standard deviations. The intent is to express in a single number the potential capability (if the process is centered) of the process to meet bilateral (two sided) tolerance limits. An index value greater than 1.0 in the Cp field 624 indicates that the total tolerance width is greater than the process variation. The assumptions include process stability (data taken over a representative period) that includes all or significant sources of variation. The data must be displayed graphically on an appropriate control chart demonstrating control and that the process data be independent and normally distributed. If all assumptions are met, then the Cp index may be used to predict the output of the process in the future. The formula is Cp=(Upper Tolerance/Spec Limit−Lower Tolerance/Spec Limit) divided by 6 Process Standard Deviations as shown in equation 1.

$$Cp = \frac{USL - LSL}{6\sigma} \text{ or } \frac{UTL - LTL}{6\sigma} \quad (1)$$

In addition, the user can enter Cpk data in Cpk field 626. The process capability index, Cpk, is the smaller of the two possible ratios of distance between a tolerance limit and the process average divided by the process variation expressed as 3 process standard deviations as shown in equation 2. The intent is to express in a single number the capability of the process to meet tolerance limits. An index value greater than 1.0 in the Cpk field 626 indicates that the smallest distance from the tolerance limit to the process mean exceeds half of the process variation. When the process mean is midway between the bilateral tolerance (two sided) then Cpk=Cp. Cpk cannot be greater than Cp. Either unilateral (one sided) or bilateral tolerance (two sided) may be used. The same assumptions must be adhered to as for Cp for it to be a predictor of the process output in the future.

$$Cpk = \text{Smaller Numeral Value of } \frac{USL - x}{3\hat{\sigma}} \text{ or } \frac{x - LSL}{3\hat{\sigma}} \quad (2)$$

When applicable, the user can enter data into DPU field 628 and % defective field 630. Defects per unit (DPU) information is used for attribute data. DPU is the number of defects found in the part being produced. The percent (%) defective is the number of defective parts found in a sample population divided by the number of total parts in the sample population multiplied by 100. Finally, the user can supply M.S.A. information in M.S.A. type field 632, M.S.A. date field 634 and M.S.A. % field 636. Measurement System Analysis (M.S.A.) methods are used to verify the adequacy of the measurement system that is used to accept hardware or test results.

Figure 7:
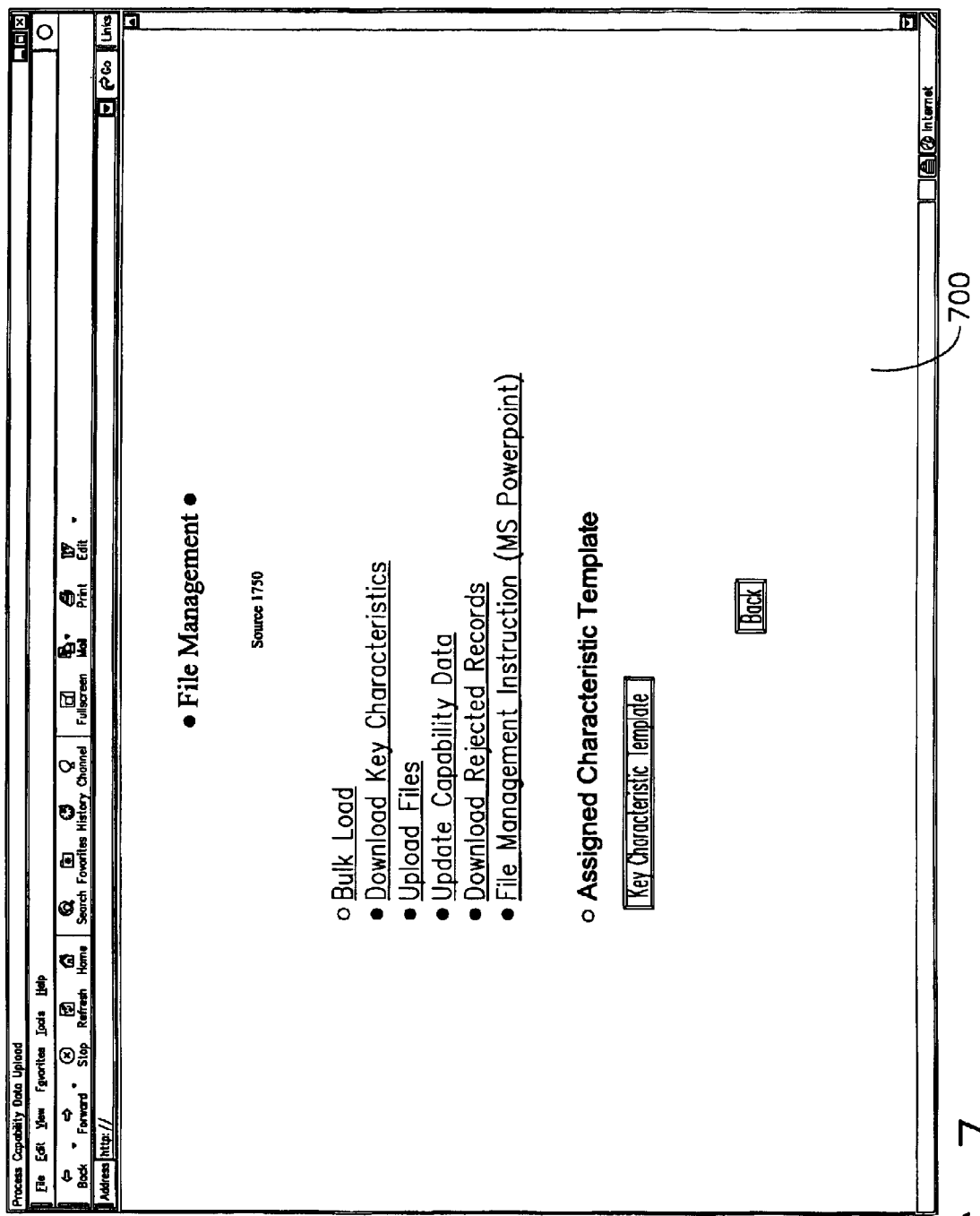
FIG. 7 illustrates a home web page of the file management portion of the PROCAP application.

Referring back to the PROCAP home page 200 on FIG. 2, the user can select the file management link 204 to access the file management portion of the PROCAP application. After the user has selected the file management link 204 from the PROCAP home page 200, the user has to select a site and a source before the user can access the file management portion of the PROCAP application. Upon entering the site and source, the user is connected to a home page or starting point for the file management portion. FIG. 7 illustrates a home page 700 for the file management portion of the PROCAP application. From the file management home page 700, the user can access a variety of different file management related features. The user can perform a bulk transfer by being able to download and save key characteristics, modify process capability data, upload updated process capability data to the PROCAP application and the database 102, update information related to process capability, and download and correct any data that was not successfully uploaded.

Figure 8:
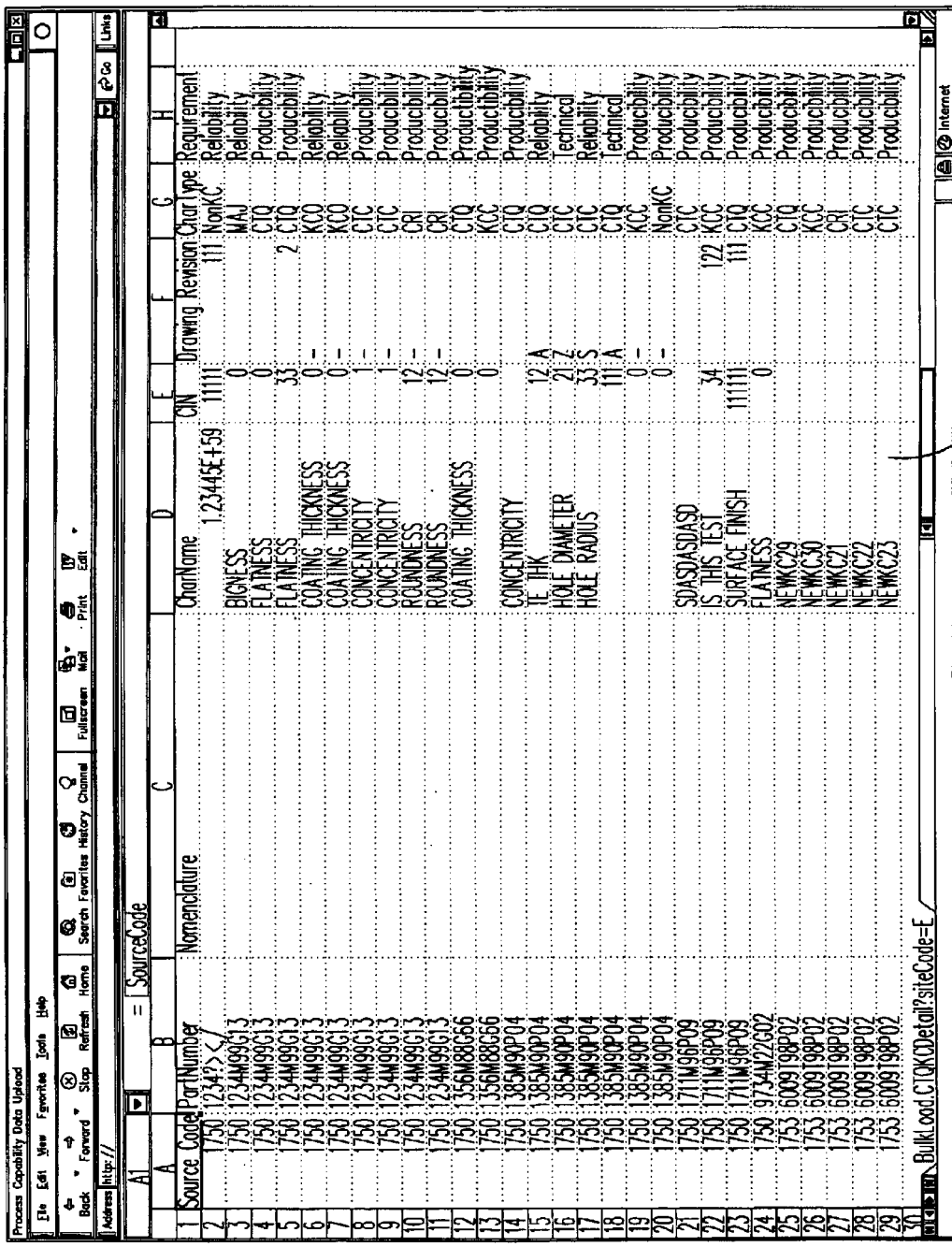
FIG. 8 illustrates a key characteristic template web page of the file management portion of the PROCAP application.

The user can also download a key characteristic template for review. The key characteristic template shows the details on the key characteristics for each part. FIG. 8 illustrates a web page 800 that includes a spreadsheet that lists the information, data and details on the key characteristics for the parts in the database 102.

As discussed above, the user has the capability to perform a bulk transfer of data to the database 102. In a bulk transfer, the user first has to select the particular part that is to have data transferred. Alternatively, the user can select to transfer data on all parts for that source. Once the user has a selected the part(s) that will be the subject of the data transfer, the user is presented with a spreadsheet of information on the part(s) selected. FIG. 9 illustrates a web page 900 that includes a spreadsheet with part information on selected parts. Some of the information that is included on the spreadsheet can relate to part information from part web page 400, key characteristic information from characteristic web page 500 and process capability information from process capability web page 600. The user can then edit or update the process capability information in the spreadsheet for several different parts and key characteristics at a single time. After the user has completed making the updates to the process capability data, the user can save the updated information for a subsequent transfer of all the updates to the database 102.

Figure 10:
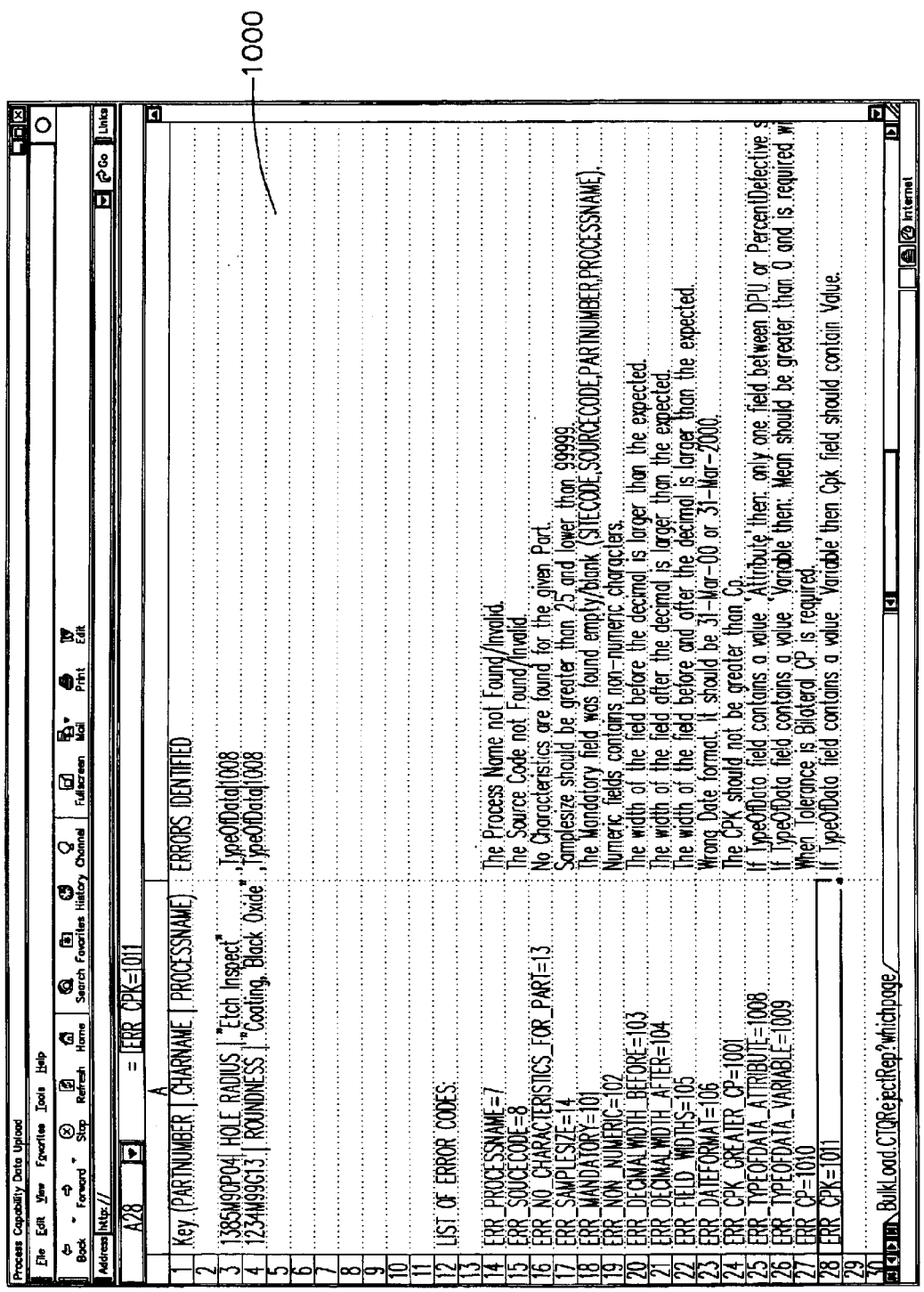
FIG. 10 illustrates an error report web page of the file management portion of the PROCAP application.

To update the database 102 with the updated process capability data the user has to first upload the file with the updated process capability data to the server computer 100. After the file with the updated process capability data has been uploaded to the server computer 100, the user can then update the database 102 to incorporate the updated process capability data. Once the database update has been completed, the user is presented with a report indicating the number of records processed, the number of records updated and the number of records that were not processed. If records were not processed successfully, the user can review a report that provides details and information on the records that were not processed successfully. FIG. 10 illustrates a web page 1000 that includes an error report for records that were not processed successfully. The user can then, after reviewing the error report, re-update the saved file with the process capability data and upload it to the database as described above.

Figure 11:
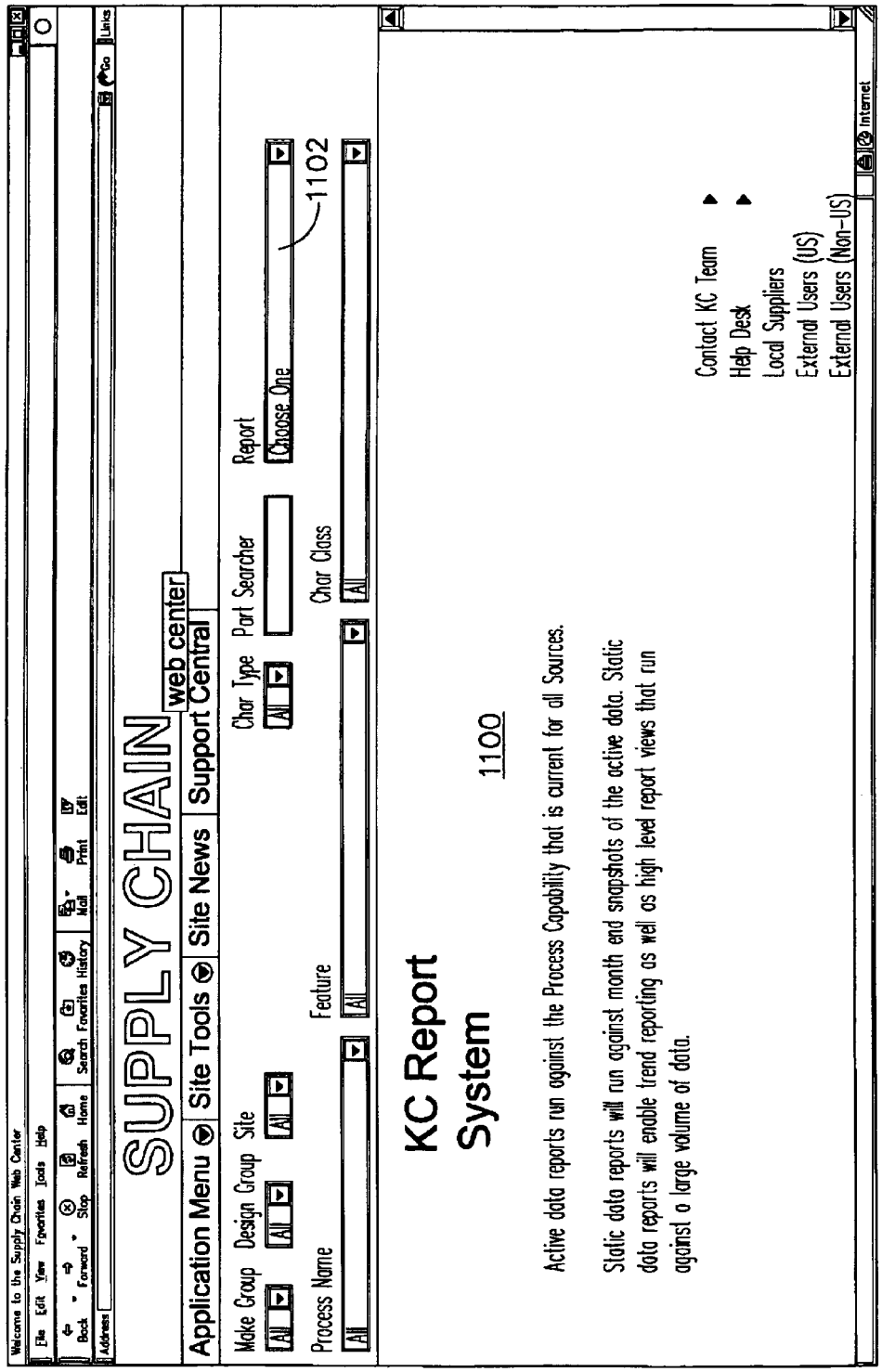
FIG. 11 illustrates a report web page of the PROCAP application for generating reports.

Referring back to the PROCAP home page 200 on FIG. 2, the user can select the reporting link 206 to access the report generation portion of the PROCAP application. After the user has selected the reporting link 206 from the PROCAP home page 200, the user is connected to a web page or starting point for the report generation portion. FIG. 11 illustrates a web page 1100 for generating several different types of reports on the information in the database 102. On report web page 1100, the user can generate a variety of different reports by selecting the particular type of report the user desires from report selection field 1102. Some of the reports a user can select from include a Cpk status report, a defects per million opportunities (DPMO) trend report, an age of data report, a DPMO summary report based on part, a DPMO summary report based on characteristic and any other type of report that can be useful to the user. In addition, the user can define the scope of the information that is included in the report. The user can limit the report to particular make groups, design groups, sites, characteristic types, parts, processes, features, characteristic classes, and combinations thereof, or the user can limit the report based on any other type of field that the user desires.

Figure 12:
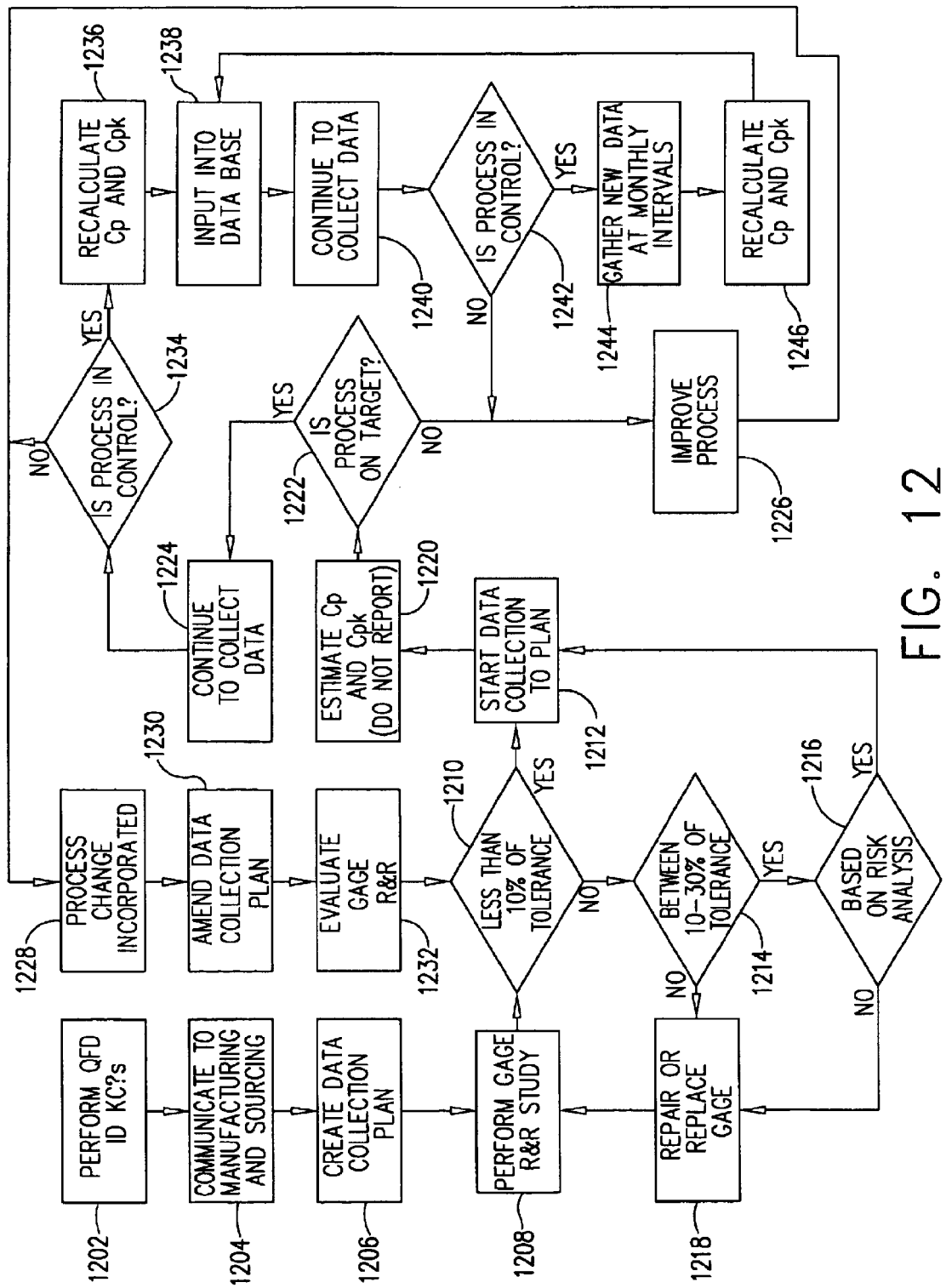
FIG. 12 illustrates a flowchart of a data collection and recording methodology.

FIG. 12 illustrates a flow chart of a methodology for process capability data collection. The process starts at step 1202 where an engineering model is created, a QFD is performed and key characteristics are identified. In step 1204, the key characteristics are communicated to manufacturing groups and sources. A data collection plan, a manufacturing process plan and a quality plan are created in step 1206. Also, additional key characteristics may also be identified in step 1206. In step 1208, a gage R&R study is performed after the product has been manufactured. A gage (gauge) is any device, instrument or apparatus used to measure or test a product or material for the purpose of acceptability, e.g. micrometer, functional gauges, tensile tester, machine probe system, optical systems, lasers, standard resistors, etc. The gage R&R % of tolerance is the result of a controlled study of the measurement process involving the interaction between people, the measuring device and the environment. The two "R's" refer to repeatability and reproducibility. Repeatability is the ability of the persons and gage to repeat a specific measurement. Reproducibility is the assessment of the difference between the persons involved in the measurement. By combining the two forms of variation, dividing by the tolerance and multiplying by 100, the assessment is made. By determining the % of tolerance or % of process variation, the process owners can evaluate the sufficiency of the measuring system. The gage R&R % of tolerance or process variation primary mission is to determine the inherent variability of the measurement system. If the variability of the measurement system is less than 10%, then the system is acceptable. When the R&R % of tolerance is inclusive of 10 and 30% this may be acceptable based on classification of characteristic, application, customer input, technology, risk analysis, etc. An R&R % of tolerance over 30% is considered not acceptable.

In step 1210, the gage R&R study is evaluated to check if it is less than 10% of tolerance. If the gage R&R study is less than 10% of tolerance, then data collection is started in step 1212 according to the data collection plan. If the gage R&R study is not less than 10% of tolerance, then the gage R&R study is checked to determine if it is between 10% and 30% of tolerance is step 1214. If the gage R&R study is between 10% and 30% of tolerance and if the percent of tolerance is acceptable based on a risk analysis in step 1216, then data collection is started in step 1212. However, if the gage R&R study is not between 10% and 30% of tolerance or the gage R&R study is between 10% and 30% of tolerance but the risk analysis in step 1216 is not acceptable, then the gage has to be repaired or replaced in step 1218 and a new gage R&R study performed in step 1208.

As discussed above, the data collection process is started in step 1212. After 15 observations are available, Cp and Cpk are estimated in step 1220. In step 1222 the process is checked to see if it is on target. If the process is on target, then data can continue to be collected in step 1224. However, if the process is not on target, the process is evaluated and improved in step 1226. After the process is improved in step 1226, the process changes are incorporated into the process plan in step 1228 and the data collection plan is amended in step 1230. In step 1232, the gage R&R is re-evaluated in view of the changes to the process plan and the data collection plan. Then in step 1210, the gage R&R study is evaluated as discussed above.

Referring back to step 1224, after a minimum of 25 observations or pieces, the process and production capability are evaluated in step 1234 to determine if the process is in control. If the process is in control, Cp and Cpk are recalculated in step 1236. If the process is not in control, then process changes are incorporated in step 1228 as discussed above. After Cp and Cpk are calculated in step 1236, the data is input into the database in step 1238. Data is continued to be collected in step 1240 and the process is again checked to determine if it is in control in step 1242. If the process is in control, then new data is gathered at monthly intervals in step 1244, Cp and Cpk are recalculated in step 1246 and subsequently input into the database 102 at step 1238. The data collection process is then restarted again. If the process is not in control in step 1242, then the process is improved at step 1226, as discussed above. Additional information on a process capability study method is provided in Addendum A.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

ADDENDUM A 1.0 Process Capability Study Method 1.1 In order to have a valid process capability study the ensuing steps can be followed. If followed, the ability to predict the process output in the future is reasonably assured, thereby permitting a company's management to effectively allocate their resources, determine costs accurately and measure the true quality of manufacturing. The process capability study can be used in any type of manufacturing environment, including job shops, assembly, or service organizations.

1.2 Valid Process Capability Study—Steps to be Followed:

1.2.1 Select an area within the company to be studied, such as machine shop, heat treating, plating lines, injected molding, stamping, etc. This is called the macro process.

1.2.2 Select a process within the macro process to be studied. As an example—The drilling of a 0.150–0.154 diameter hole in a material on a vertical mill. Accordingly this is known as the micro process.

1.2.3 Establish a team of people who are responsible for the micro process. This would include operators/technicians, supervisors, engineers and specialists.

a) Determine all Sources of Variation (S.O.V.) that act upon the micro process (i.e., material hardness, spindle run out, drill type, drill speed, holding fixture, operator influence, heats of material, temperatures, etc.).

b) Determine significant S.O.V. and the length of time needed to be seen by the process (multiples of S.O.V.). The time will determine the number of parts that will be generated by the process.

c) Rectify the process documentation to the actual process. If any discrepancies exist, then correct them before the data is taken.

d) Selection of characteristics to be studied. The selection will include both customer required and supplier selected characteristics. The customer required key characteristics are usually specified as what is to be measured, not how often. In cases of low volumes, 100% of the product produced is usually recommended, however, in high volume, rational sub-grouping may be employed. Rational sub-grouping is defined as minimum variability within sub-groups and maximum variability between sub-groups (i.e. 5 consecutive pieces per 2 hours). For supplier selected characteristics, rational sub grouping or 100% of product produced depends upon the S.O.V activity.

e) Create a data collection plan. The plan will include how many measurements will be taken, and under what conditions, rounding rules on significant digits, accuracy and measurement system analysis (MSA), etc.

f) A measurement system analysis (MSA) study is required for every specified Key Characteristic(s) and they are as follows: Critical to Quality (CTQ or Engineering "A"); Critical to Cost (CTC or Engineering "B"); Engineering "C" Characteristic(s). Other characteristic(s) such as Key Quality Characteristics (KQC) and Key Control Characteristics (KCC) may require MSA studies at the discretion of the requestor.

The most commonly applied MSA method is the Gage R&R. The Gage R&R is based upon bi-lateral (two-sided) engineering tolerances. However, there are conditions that would dictate the use of other types of MSA methods. These methods can include: Percent of Process Variation; Distinct Categories; and Attribute.

Starting with the lowest Cpk value and ending with the highest, a plan must be in place to perform the required MSA studies for all Key Characteristic(s) specified as required.

Some Key Characteristics can only be evaluated by destructive testing (e.g., ultimate strength, elongation, and some other properties in mechanical and chemical testing). A material testing laboratory currently certified to quality specifications as applicable: (1) certified material testing laboratory S-400 (metallic) or (2) certified material testing laboratory S-450 (non-metallic) would be acceptable as a substitute for a MSA study. The date on the laboratory Certificate of Approval would be used as the MSA study date.

g) Establish a log to record events (i.e., process changes, power outages, material changes, shifts operations, etc.).

h) Select a control chart(s) that is appropriate for the process under study. Short run type charts, multi-variant charts, time series charts (e.g., EWMA, CU-SUM) are also considered as appropriate charts, along with the typical 7 Shewhart charts to establish that a process is in statistical control.

1.2.4 Take data and plot on control chart(s).

a) Determining if process is in statistical control. A minimum of 25 plot points (n=3 to 5/sub-groups) in statistical control for X Bar & R charts are needed to establish that only common cause variation is present. In cases of individual and moving range, more plottted points may be needed to verify that all significant S.O.V. have been active in the process which is usually 50 or more plot points. 10 to 15 plot points are needed to calculate temporary control limits for short run applications.

1.2.5 Analyze Data a) Determine if the individual measurements are normally distributed. Some of the usual diagnostic tools are: normal probability plot with confidence limits and histogram with goodness-of-fit-test.

b) A minimum number of measurements is needed to differentiate between a sampling distribution and the underlying distribution of the process. With all significant S.O.V. acting on process the number could be in the range of 75 to 125 measurements.

c) Determine if individual measurements are statistically independent. Many processes today have structural variation caused by a time series influence(s). These would include tool wear, multi-spindle machine relationships, physical relationships (strength vs. ductility), software for numerical control (NC) machines, etc. The usual indicator is a lot of out-of-control plot points that no cause can be found. Modifications to control limits or time series control charts may be needed to minimize the effects of structural variation.

1.2.6 Calculate process capability ratios if individual observations are independent and normally distributed (see step 1.2.5). If the process is not normally distributed or that structural variation is present then the sample standard deviation=$\{Sum\ of\ (X_i-\bar{x})^2 \div N-1\}^{1/2}$ may be substituted for the process standard deviation $\bar{R}/d_2$ in the calculations or PCI's. If the individual observations are not normally distributed, any of the following methods may be used to calculate PCI's: the direct transformation method; Pearson or Johnson general formula routines found in some computer software; mathematical probability method, hypothesizing underlying distribution, estimate parameters perform goodness-of-fit-test on collected data. Report Process Capability Ratios. (Cp, Cpk, etc.).

1.2.7 Write Final Report paying attention to lessons learned both good and bad.

1.2.8 Use team to expand to other micro processes and use the team to train other teams that are studying processes.

Reporting Requirements of Key Characteristic Data to Company 2.1 A template will be provided by company to notify the supplier that CTQ's etc. have been indentified for their part or processes. The header and CTQ characteristic information will be filled out by the company personnel. The manufacturing or testing data will be recorded by the supplier and sent to the company.

2.2 The initial Process Capability data for each required K.C. will be as follows: (1) Inspection Method; (2) Measurement System Analysis Study Date; (3) MSA study results; (4) Collection Method; (5) Process Type and Name; (6) Sample Manufacturing start date and finish date; (7) Sample Size; (8) Type of data (Attribute or Variable); (9) Cp & Cpk; (10) Mean and Standard Deviation; and (11) Type of Distribution. The upper and lower control limits are at the discretion of the company. The following information is required from the supplier in order to initialize or update the database process capability data: (1) Process Name; (2) Sample Manufacturing start date; (3) Sample size; (4) Mean; (5) Type and amount of the Standard Deviation; (6) Cpk value; and (7) Normal or Non-Normal Distribution.

2.3 All variable data will be reported as Cp, Cpk, mean and standard deviation. All attribute data will be reported as Cpk using standard methods to calculate Cpk.

2.4 After completion of the supplier portion of the template, it will be submitted to the company.

2.5 Once the initial data has been submitted to the company, it is a requirement that additional data will also be submitted as it is generated. The data collection methodology demonstrates the method and samples required for initial and updating of the Process Capability data. The frequency of updating depends on the frequency and manufacturing volume. For example, (1) if the years production is completed on one production run then the data will be required once per year, (2) if the yearly volume is sub-divided into monthly, bi-monthly or quarterly manufacturing runs then the data will be required on that frequency unless otherwise directed by the company.

2.6 As long as the process has not changed then the new data will be summed with the previous data and new statistics (Cp, Cpk, Mean and Standard Deviation) are calculated and a new manufacturing end date is generated. When the process is changed by manufacturing, then a new record will be created with a new start date and end date.

2.7 Authority may be granted by the product quality engineer (PQE) to directly access your template on the company web or network. Instructions and requirements will be provided as necessary for web access.

Determination of Process Capability using Attributed Data 3.1 Using Attribute Data (Go/No Go, Accept/Reject, etc.) to determine process capability for some characteristics of interest is a viable method. However, larger sample sizes are needed to have a confidence in the process capability estimates. The minimum sample size needed is at least 500 observations of the characteristic of interest for 50 or more production parts.

3.2 There are three methods of calculating process capability depending upon how many defects can exist on a part.

3.2.1 At most one defect can exist per part.

3.2.2 More than one defect can exist per part.

3.2.3 If no defects are found in a sample and one or more than one defects can exist per part.

3.2.4 The defects per unit (dpu) is the basic statistic to be used to represent attribute data and is calculated as follows:

$$dpu = \frac{\text{Total number of defects observed for characteristics of interest}}{\text{Total number of parts inspected}}$$

3.2.5 To calculate process capability, using Cpk as an estimate, based on, at most, one defect exists per part. Note: A reasonable approach is to treat proportion defective as equal to probability of normal distribution being outside of the tolerance limits.
 a) Calculate proportion defective.

$$\text{proportion defective} = \frac{\text{Total number of defective parts}}{\text{Total number of parts inspected}}$$

b) Transform to Z score using standard normal table.
 c) Divide Z score by 3 to obtain Cpk value.
3.2.6 To calculate process capability, using Cpk as an estimate, based on, more than one defect exists per part
 a) Calculate "dpu" statistic.
 b) Calculate yield by raising "e" (2.71828) to the minus dpu (−dpu) ($e^{-dpu}$). Based on Poisson distribution, yield is the proportion that does not have defects.
 c) Calculate proportion defective by substracting the yield from 1.0. (Note: This must be less than one. If not, you have made an error).
 d) Transform to Z score.
 e) Divide Z score by 3 to obtain Cpk value.
3.2.7 If no defects are found (C=0) in a sample and one or more defects can exist per part, calculation of process of capability is as follows using Bayesian method:
 a) Calculate p(d).

$$\text{“}p(d)\text{”} = \frac{1.0}{(\text{Total number of parts inspected} + 2) \text{ multiplied by number of opportunities per part}}$$

b) Transform to Z score.
 c) Divide Z score by 3 to obtain Cpk value. In one example, if there is only one opportunity per part then the denominator is equal to the number of parts measured plus 2, multiplied by one. In another example, if there are five identical holes on a part and they are all measured on ten parts, then the denominator is ten plus 2, multiplied by 5, which equals 60.
3.2.8 Since the number of parts inspected raises very rapidly when a higher Cpk is requested, the next section will help to resolve that issue. For example, if the denominator is 750 then the Cpk is 1.004 and if the denominator is 30,120 then the Cpk=1.33.
4. Determination of Process Capability using Attribute Gages
4.1 Using attribute gages in the form of go/no go for single or multiple features is an acceptable method of determining process capability. The gage must be under a calibration system.
4.2 If the gage is used to determine the capability of CTQ's then the gage should be designed to accept product by using slightly less than 100% of the company engineering tolerance. Attribute gages as a rule should be designed to reject 100% of the out of print part and accept slightly less than 100% of the within print parts. This will provide the equivalent of a 1.0 Cpk with no failures (C=O) for 500 parts or minimum of 50 parts with 10 or more exact characteristics measured.
4.3 A higher Cpk value can be obtained by reducing the company engineering tolerance in the initial gage design as follows using 500 measurements.
 4.3.1 In order to obtain a Cpk of 1.33 the attribute gage for that characteristic/KC would accept parts that were within the center 75% of the engineering tolerance.

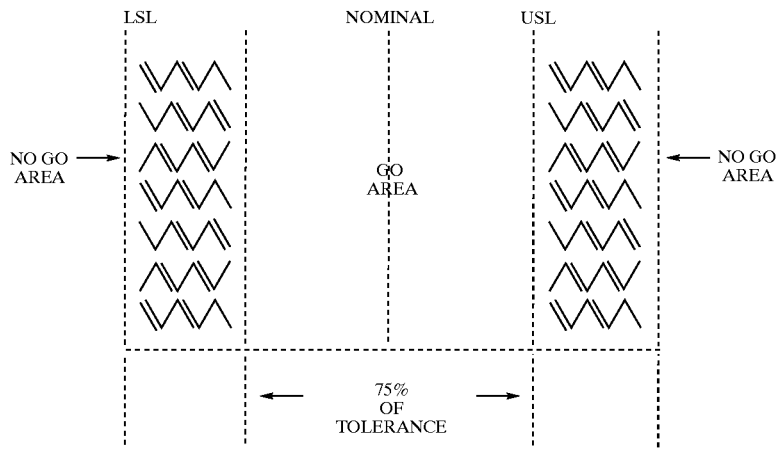

4.3.2 For a Cpk of 1.67 the engineering tolerance would be reduced to 60% in the gage. For a Cpk of 2.00 the engineering tolerance would be reduced to 50% in the gage. See above.

TABLE A

Minimum Ĉpk Value for Two Sided 90% C Interval

$$\hat{C}pk - 1.645\left(\frac{1}{9n} + \frac{\hat{C}pk^2}{2n-2}\right)^{1/2}$$

| Calculated Ĉpk | \multicolumn{14}{c}{Number of individual measurements (n)} | | | | | | | | | | | | | |
|---|---|---|---|---|---|---|---|---|---|---|---|---|---|---|
| | 25 | 30 | 40 | 50 | 60 | 70 | 80 | 90 | 100 | 110 | 120 | 130 | 140 | 150 |
| 1.00 | 0.738 | 0.762 | 0.795 | 0.817 | 0.833 | 0.845 | 0.855 | 0.864 | 0.870 | 0.877 | 0.882 | 0.867 | 0.891 | 0.895 |
| 1.05 | 0.776 | 0.802 | 0.836 | 0.859 | 0.876 | 0.889 | 0.900 | 0.908 | 0.916 | 0.922 | 0.927 | 0.932 | 0.937 | 0.940 |
| 1.10 | 0.817 | 0.842 | 0.878 | 0.901 | 0.919 | 0.933 | 0.944 | 0.953 | 0.960 | 0.967 | 0.972 | 0.978 | 0.982 | 0.985 |
| 1.15 | 0.856 | 0.882 | 0.919 | 0.944 | 0.962 | 0.976 | 0.987 | 0.997 | 1.005 | 1.012 | 1.018 | 1.023 | 1.027 | 1.032 |
| 1.20 | 0.895 | 0.922 | 0.960 | 0.966 | 1.005 | 1.020 | 1.031 | 1.041 | 1.049 | 1.056 | 1.063 | 1.068 | 1.073 | 1.077 |
| 1.25 | 0.934 | 0.962 | 1.002 | 1.026 | 1.048 | 1.063 | 1.075 | 1.085 | 1.094 | 1.101 | 1.108 | 1.113 | 1.118 | 1.123 |
| 1.30 | 0.972 | 1.002 | 1.043 | 1.070 | 1.091 | 1.107 | 1.119 | 1.130 | 1.138 | 1.146 | 1.153 | 1.158 | 1.164 | 1.168 |
| 1.33 | 0.996 | 1.026 | 1.068 | 1.096 | 1.117 | 1.133 | 1.145 | 1.156 | 1.165 | 1.173 | 1.180 | 1.186 | 1.191 | 1.196 |
| 1.35 | 1.011 | 1.042 | 1.084 | 1.113 | 1.134 | 1.150 | 1.163 | 1.174 | 1.183 | 1.191 | 1.198 | 1.204 | 1.209 | 1.223 |
| 1.40 | 1.050 | 1.081 | 1.125 | 1.154 | 1.176 | 1.193 | 1.207 | 1.218 | 1.227 | 1.235 | 1.243 | 1.249 | 1.254 | 1.259 |
| 1.45 | 1.089 | 1.121 | 1.166 | 1.197 | 1.219 | 1.237 | 1.251 | 1.262 | 1.272 | 1.280 | 1.287 | 1.294 | 1.300 | 1.305 |
| 1.50 | 1.127 | 1.161 | 1.207 | 1.239 | 1.262 | 1.280 | 1.294 | 1.306 | 1.316 | 1.325 | 1.333 | 1.339 | 1.345 | 1.350 |
| 1.55 | 1.166 | 1.201 | 1.249 | 1.231 | 1.305 | 1.323 | 1.336 | 1.350 | 1.361 | 1.370 | 1.377 | 1.364 | 1.390 | 1.396 |
| 1.60 | 1.205 | 1.240 | 1.290 | 1.323 | 1.348 | 1.367 | 1.382 | 1.394 | 1.405 | 1.141 | 1.422 | 1.429 | 1.436 | 1.441 |
| 1.65 | 1.243 | 1.280 | 1.331 | 1.365 | 1.390 | 1.410 | 1.426 | 1.436 | 1.449 | 1.459 | 1.487 | 1.474 | 1.481 | 1.487 |
| 1.70 | 1.282 | 1.319 | 1.372 | 1.407 | 1.433 | 1.453 | 1.489 | 1.483 | 1.494 | 1.504 | 1.512 | 1.519 | 1.526 | 1.532 |
| 1.75 | 1.320 | 1.359 | 1.413 | 1.449 | 1.476 | 1.496 | 1.513 | 1.527 | 1.538 | 1.548 | 1.557 | 1.564 | 1.571 | 1.577 |
| 1.80 | 1.359 | 1.399 | 1.454 | 1.491 | 1.518 | 1.540 | 1.557 | 1.571 | 1.583 | 1.593 | 1.602 | 1.610 | 1.616 | 1.622 |
| 1.85 | 1.397 | 1.436 | 1.495 | 1.533 | 1.561 | 1.583 | 1.600 | 1.615 | 1.627 | 1.637 | 1.646 | 1.655 | 1.662 | 1.668 |
| 1.90 | 1.436 | 1.476 | 1.535 | 1.575 | 1.604 | 1.626 | 1.644 | 1.659 | 1.671 | 1.682 | 1.691 | 1.700 | 1.707 | 1.713 |
| 1.95 | 1.474 | 1.517 | 1.577 | 1.617 | 1.646 | 1.689 | 1.688 | 1.703 | 1.716 | 1.727 | 1.736 | 1.745 | 1.752 | 1.759 |
| 2.00 | 1.513 | 1.577 | 1.618 | 1.659 | 1.699 | 1.712 | 1.731 | 1.747 | 1.760 | 1.771 | 1.781 | 1.790 | 1.797 | 1.804 |

Tables A and B illustrate two tables that may be used to determine the minimum expected Cpk value for a process capability. First, select a confidence level (C level) and use the calculated Cpk value from the process under study and find that number in the left hand column called "Calculated Cpk". Then move along that row until you arrive at number of individual measurement (n-top of page) in the study. That junction will be the minimum expected Cpk value for the calculated Cpk.

For example, Cpk calculated is 1.50, the number of measurements is 80 and the confidence interval is 90%. Table A indicates that the minimum value of 1.50 is 1.294. If the specification for the Cpk in the above example is 1.0, then the process is considered capable of meeting the customer's requirement. However, if the specification is 1.33, then the process is not capable of meeting the requirements on a long term basis. At some time in the future, Cpk may be as low as 1.294 without the process losing it's stability. Action is indicated by the low minimum value and now management has to make a decision to: 1. Reduce the variation; 2. Move the process mean toward the center of the specificiation of the characteristic; 3. Request engineering to revise the tolerance or specification; 4. Do nothing; and 5. Increase the length of the study.

Again, using Table A, move along the 1.50 Cpk row until N=120 and now read the minimum Cpk value as 1.333. Now the process would be capable of sustaining a 1.33 level over a long time if there were 120 initial measurements with the same mean and standard deviation.

Table B may be used in the following manner to answer the questions, "What is the Cpk value I need to assure that I have a minimum of Cpk of 1.30 with 40 parts"? Let's suppose that we are comfortable with a 95% confidence level. On the 95% confidence table (Table B) find the number of parts (40) on the row of individual measurements. Move down the n=40 column until you reach 1.30 or the next larger number. Mark the spot and now follow that row until you come to the calculated Cpk column. The answer is 1.70.

TABLE B

Minimum Ĉpk Value for Two Sided 95% C Interval

$$\hat{C}pk - 1.960\left(\frac{1}{9n} + \frac{\hat{C}pk^2}{2n-2}\right)^{1/2}$$

| Calculated Ĉpk | \multicolumn{14}{c}{Number of individual measurements (n)} | | | | | | | | | | | | | |
|---|---|---|---|---|---|---|---|---|---|---|---|---|---|---|
| | 25 | 30 | 40 | 50 | 60 | 70 | 80 | 90 | 100 | 110 | 120 | 130 | 140 | 150 |
| 1.00 | 0.685 | 0.716 | 0.755 | 0.782 | 0.801 | 0.816 | 0.828 | 0.836 | 0.846 | 0.853 | 0.860 | 0.865 | 0.870 | 0.875 |
| 1.05 | 0.725 | 0.755 | 0.795 | 0.823 | 0.843 | 0.858 | 0.871 | 0.881 | 0.890 | 0.897 | 0.904 | 0.910 | 0.915 | 0.919 |
| 1.10 | 0.776 | 0.793 | 0.835 | 0.863 | 0.884 | 0.901 | 0.914 | 0.924 | 0.933 | 0.941 | 0.948 | 0.954 | 0.959 | 0.964 |
| 1.15 | 0.779 | 0.831 | 0.875 | 0.904 | 0.926 | 0.943 | 0.956 | 0.968 | 0.977 | 0.985 | 0.992 | 0.998 | 1.004 | 1.009 |
| 1.20 | 0.836 | 0.869 | 0.914 | 0.945 | 0.968 | 0.985 | 0.999 | 1.011 | 1.021 | 1.029 | 1.036 | 1.043 | 1.040 | 1.054 |

TABLE B-continued

Minimum Ĉpk Value for Two Sided 95% C Interval $$\hat{C}pk - 1.960\left(\frac{1}{9n} + \frac{\hat{C}pk^2}{2n-2}\right)^{1/2}$$

| Calculated Ĉpk | Number of individual measurements (n) | | | | | | | | | | | | | |
|---|---|---|---|---|---|---|---|---|---|---|---|---|---|---|
| | 25 | 30 | 40 | 50 | 60 | 70 | 80 | 90 | 100 | 110 | 120 | 130 | 140 | 150 |
| 1.25 | 0.873 | 0.907 | 0.954 | 0.986 | 1.009 | 1.027 | 1.042 | 1.054 | 1.064 | 1.073 | 1.080 | 1.087 | 1.093 | 1.098 |
| 1.30 | 0.910 | 0.945 | 0.994 | 1.027 | 1.051 | 1.069 | 1.085 | 1.097 | 1.107 | 1.117 | 1.124 | 1.131 | 1.138 | 1.143 |
| 1.33 | 0.932 | 0.967 | 1.017 | 1.051 | 1.076 | 1.095 | 1.110 | 1.123 | 1.134 | 1.143 | 1.151 | 1.158 | 1.164 | 1.170 |
| 1.35 | 0.946 | 0.983 | 1.033 | 1.067 | 1.092 | 1.112 | 1.127 | 1.140 | 1.151 | 1.180 | 1.168 | 1.176 | 1.182 | 1.188 |
| 1.40 | 0.983 | 1.020 | 1.073 | 1.108 | 1.134 | 1.154 | 1.170 | 1.183 | 1.194 | 1.204 | 1.212 | 1.220 | 1.226 | 1.232 |
| 1.45 | 1.019 | 1.058 | 1.112 | 1.148 | 1.175 | 1.198 | 1.212 | 1.226 | 1.238 | 1.248 | 1.256 | 1.264 | 1.271 | 1.277 |
| 1.50 | 1.056 | 1.096 | 1.151 | 1.189 | 1.217 | 1.238 | 1.255 | 1.269 | 1.281 | 1.291 | 1.300 | 1.308 | 1.315 | 1.322 |
| 1.55 | 1.092 | 1.134 | 1.191 | 1.230 | 1.258 | 1.280 | 1.296 | 1.312 | 1.324 | 1.335 | 1.344 | 1.352 | 1.360 | 1.366 |
| 1.60 | 1.129 | 1.171 | 1.230 | 1.270 | 1.299 | 1.322 | 1.340 | 1.355 | 1.368 | 1.179 | 1.388 | 1.397 | 1.404 | 1.411 |
| 1.65 | 1.165 | 1.209 | 1.270 | 1.311 | 1.341 | 1.364 | 1.383 | 1.398 | 1.411 | 1.422 | 1.432 | 1.441 | 1.445 | 1.455 |
| 1.70 | 1.202 | 1.247 | 1.309 | 1.351 | 1.382 | 1.408 | 1.425 | 1.441 | 1.454 | 1.455 | 1.476 | 1.485 | 1.493 | 1.500 |
| 1.75 | 1.238 | 1.284 | 1.348 | 1.391 | 1.423 | 1.448 | 1.468 | 1.484 | 1.496 | 1.509 | 1.520 | 1.529 | 1.537 | 1.544 |
| 1.80 | 1.274 | 1.322 | 1.389 | 1.432 | 1.484 | 1.480 | 1.510 | 1.527 | 1.541 | 1.553 | 1.584 | 1.573 | 1.581 | 1.589 |
| 1.85 | 1.311 | 1.359 | 1.427 | 1.472 | 1.506 | 1.532 | 1.552 | 1.570 | 1.594 | 1.597 | 1.606 | 1.617 | 1.626 | 1.633 |
| 1.90 | 1.347 | 1.397 | 1.466 | 1.513 | 1.547 | 1.574 | 1.595 | 1.612 | 1.627 | 1.640 | 1.651 | 1.661 | 1.670 | 1.678 |
| 1.95 | 1.383 | 1.434 | 1.505 | 1.563 | 1.588 | 1.615 | 1.637 | 1.655 | 1.671 | 1.684 | 1.695 | 1.705 | 1.714 | 1.722 |
| 2.00 | 1.419 | 1.472 | 1.544 | 1.593 | 1.629 | 1.657 | 1.660 | 1.698 | 1.714 | 1.727 | 1.739 | 1.749 | 1.758 | 1.767 |

What happens if the number of samples or the calculated Cpk is not shown on the table? Rounding up or down to fit the table is not a very good idea. Calculate the exact value by using Bissell's formula is one option. The other is using the table and interpolate from the intervals surrounding the missing calculated Cpk or "n" information. We will assume linearity between the closed table values. The following is an example of how to use interpolation of the table.

Suppose n=75 and the calculated Cpk is 1.40. What is the minimum expected Cpk at a 90% C level? Since n=75 is not on Table A, we will have to interpolate between n=70 and n=80 for the minimum value of Cpk.

Method One

N=75 is half way between n=70 and n=λ then added the two minimum values of n=70 and 80 and divide by two will suffice (e.g., 1.193+1.207=2.400 divided by 2=1.200). This is the easy way when the n's or calculated Cpk's are half or midway between the tabled values.

Method Two (Long Method)

Again n=75. Subtract the largest Cpk calculated value from the smaller Cpk calculated value (e.g., 1.207−1.193=0.014). Now divide the remainder by 10 to find next smallest incremental value between 70 and 80 (e.g. 0.014 divided by 10=0.0014). Next, multiply by incremental value needed, 5, and add to the smallest calculated Cpk for n=70 (e.g., 0.0014×5=0.007 and 0.007+1.193=1.200). For this example, Method 2 provides same answer as Method 1 because the missing value is midway between.

Suppose we needed to find the minimum Cpk for n=73. In step #3 of Method 2, the 0.0014 is multiplied by 3, instead of 5, (e.g. 0.0014×3=0.0042 and 0.0042+1.193=1.1972), which results in a minimum expected Cpk alue of 1.1972. The same methods apply when the missing value is in the column and/or in the row (as demonstrated).

What is claimed is:

1. A system for collecting and recording product data on a plurality of products, the system comprising:
   a server computer, the server computer comprising a storage device and a processor;
   a database, the database storing product data on a plurality of products, wherein product data includes process capability information for each product of the plurality of products;
   an application to manage entry, storage and retrieval of process capability information in the database by a user, the application being stored in the storage device of the server computer, the application further comprising:
      a product information section, the product information section comprising:
         means for providing, updating and reviewing process capability information for a product;
         means for providing, updating and reviewing source information on a product source;
         means for providing, updating and reviewing product information on a product; and
         means for providing, updating and reviewing characteristic information on a product;
      a file management section, the file management section comprising means for performing a bulk transfer of process capability information for at least one product; and
      a report generation section, the report generation section comprising means for generating at least one report using the process capability information in the database; and
   a client computer in communication with the server computer, the application being accessible by the user on the client computer;
   wherein the means for providing, updating and reviewing source information further comprises means for designating a product source;
   the source information includes site information, code information, name information and a product list of products produced by the designated product source;
   the product information section further comprises means for selecting a product from the product list of the designated product source;
   product information includes number information, drawing information, and description information for the selected product; and
   the means for providing, updating and reviewing product information further comprises:

means for assigning a product to the designated product source;

means for removing a product from the designated product source; and means for retrieving product information from the database for a product based on number information provided by the user.

2. A system for collecting and recording product data on a plurality of products, the system comprising:

a server computer, the server computer comprising a storage device and a processor;

a database, the database storing product data on a plurality of products, wherein product data includes process capability information for each product of the plurality of products;

an application to manage entry, storage and retrieval of process capability information in the database by a user, the application being stored in the storage device of the server computer, the application further comprising:

a product information section, the product information section comprising:

means for providing, updating and reviewing process capability information for a product;

means for providing, updating and reviewing source information on a product source;

means for providing, updating and reviewing product information on a product; and means for providing, updating and reviewing characteristic information on a product;

a file management section, the file management section comprising means for performing a bulk transfer of process capability information for at least one product; and a report generation section, the report generation section comprising means for generating at least one report using the process capability information in the database; and a client computer in communication with the server computer, the application being accessible by the user on the client computer;

wherein the means for providing, updating and reviewing source information further comprises means for designating a product source;

the source information includes site information, code information, name information and a product list of products produced by the designated product source;

the product list includes a list of characteristics for each product in the product list;

the product information section further comprises means for selecting a product and a characteristic from the product list of the designated product source;

characteristic information includes name information, type information, specification information, requirement information, and tolerance information; and the means for providing, updating and reviewing characteristic information further comprises:

means for assigning a characteristic to the selected product; and means for removing a characteristic from the selected product.

3. A system for collecting and recording product data on a plurality of products, the system comprising:

a server computer, the server computer comprising a storage device and a processor;

a database, the database storing product data on a plurality of products, wherein product data includes process capability information for each product of the plurality of products;

an application to manage entry, storage and retrieval of process capability information in the database by a user, the application being stored in the storage device of the server computer, the application further comprising:

a product information section, the product information section comprising means for providing, updating and reviewing process capability information for a product;

a file management section, the file management section comprising means for performing a bulk transfer of process capability information for at least one product; and a report generation section, the report generation section comprising means for generating at least one report using the process capability information in the database; and a client computer in communication with the server computer, the application being accessible by the user on the client computer;

wherein the file management section further comprises means for selecting a product source;

the means for performing a bulk transfer of process capability information further comprises:

means for selecting at least one product from the selected product source for a transfer of process capability information;

means for providing, updating and reviewing product data and process capability information for the selected at least one part;

means for uploading the provided and updated product data and process capability information to the server computer; and means for updating the database with the uploaded product data and process capability information from the server computer.

4. The system of claim 3 wherein:

the product data further includes characteristic information for each product of the plurality of products:

the file management section further comprises means for downloading the characteristic information for at least one product selected by a user; and the means for performing a bulk transfer of process capability information further comprises means for correcting errors in the uploaded product data and process capability information.

5. A computer program product embodied on a computer readable medium and executable by a computer for collecting and recording product data on a plurality of products, the computer program product comprising:

a database, the database storing product data on a plurality of products, wherein product data includes process capability information for each product of the plurality of products;

a characteristic system, the characteristic system comprising:

means for entering process capability information for a product in the data base by a user;

means for entering source information on a source of a product by the user, the means for entering source information further comprises means for designating the source of a product and source information includes site information, code information, name information and a product list of products produced by the designated source;

means for entering product information on a product by the user; and means for entering characteristic information on a product by the user;

a file management system, the file management system comprising means for programming a bulk transfer of process capability information for at least one product to the database by the user; and a report generation system, the report generation system comprising means for generating at least one report using the product data in the database;

wherein the characteristic system further comprises means for selecting a product from the product list on the designated source;

product information includes number information, drawing information, and description information for the selected product; and the means for entering product information on a product further comprises:

means for updating previously entered product information;

means for assigning a product to the designated source;

means for removing a product from the designated source; and means for retrieving product information from the database for a product based on the number information provided by the user.

6. A computer program product embodied on a computer readable medium and executable by a computer for collecting and recording product data on a plurality of products, the computer program product comprising:

a database, the database storing product data on a plurality of products, wherein product data includes process capability information for each product of the plurality of products;

a characteristic system, the characteristic system comprising:

means for entering process capability information for a product in the database by a user;

means for entering source information on a source of a product by the user, the means for entering source information further comprises means for designating the source of a product and source information includes site information, code information, name information and a product list of product produced by the designated source;

means for entering product information on a product by the user; and means for entering characteristic information on a product by the user;

a file management system, the file management system comprising means for performing a bulk transfer of process capability information for at least one product to the database by the user; and a report generation system, the report generation system comprising means for generating at least one report using the product data in the database;

wherein the product list includes a list of characteristics for each product in the product list;

the characteristic system further comprises means for selecting a product and a characteristic from the product list of the designated source;

characteristic information includes name information, type information, specification information, requirement information, and tolerance information; and the means for entering characteristic information on a product further comprises:

means for updating previously entered characteristic information;

means for assigning a characteristic to the selected product; and means for removing a characteristic from the selected product.

7. A computer program product embodied on a computer readable medium and executable by a computer for collecting and recording product data on a plurality of products, the computer program product comprising:

a database, the database storing product data on a plurality of products, wherein product data includes process capability information for each product of the plurality of products;

a characteristic system, the characteristic system comprising means for entering process capability information for a product in the database by a user;

a file management system, the file management system comprising means for performing a bulk transfer of process capability information for at least one product to the database by the user; and a report generation system, the report generation system comprising means for generating at least one report using the product data in the database;

wherein the means for performing a bulk transfer of process capability information further comprises:

means for selecting at least one product for a transfer of process capability information;

means for updating product data for selected at least one part;

means for uploading the updated product data to the server computer; and means for updating the database with the uploaded product data form the server computer.

8. The computer program product of claim 7 wherein:

product data further includes characteristic information for each product of the plurality of products;

the file management system further comprises means for downloading the characteristic information for at least one product selected by the user; and the means for performing a bulk transfer of process capability information further comprises:

means for generating a report on results of the upload of the updated product data; and means for correcting errors in the uploaded product data.

* * * * *

UNITED STATES PATENT AND TRADEMARK OFFICE
CERTIFICATE OF CORRECTION

PATENT NO. : 6,961,732 B2  Page 1 of 1
DATED : November 1, 2005
INVENTOR(S) : Hellemann et al.

It is certified that error appears in the above-identified patent and that said Letters Patent is hereby corrected as shown below:

Column 25,
Line 9, "programming" should be -- performing --.

Column 26,
Line 42, "for selected" should be -- for the selected --.

Signed and Sealed this

Seventh Day of March, 2006

JON W. DUDAS
*Director of the United States Patent and Trademark Office*

UNITED STATES PATENT AND TRADEMARK OFFICE
CERTIFICATE OF CORRECTION

PATENT NO. : 6,961,732 B2  
APPLICATION NO. : 10/022296  
DATED : November 1, 2005  
INVENTOR(S) : Hellemann et al.

Page 1 of 1

It is certified that error appears in the above-identified patent and that said Letters Patent is hereby corrected as shown below:

In column 25, line 9, "programming" should be -- performing --.

In column 26, line 42, "for selected" should be -- for the selected --.

Signed and Sealed this

Twenty-first Day of July, 2009

JOHN DOLL  
*Acting Director of the United States Patent and Trademark Office*